United States Patent [19]
Buckley et al.

[11] Patent Number: 5,546,316
[45] Date of Patent: Aug. 13, 1996

[54] COMPUTER CONTROLLED SYSTEM FOR VENDING PERSONALIZED PRODUCTS

[75] Inventors: Stephen P. Buckley, Kansas City, Mo.; Thomas B. Banks, Prairie Village, Kans.

[73] Assignee: Hallmark Cards, Incorporated, Kansas City, Mo.

[21] Appl. No.: 864,418

[22] Filed: Apr. 6, 1992

Related U.S. Application Data

[63] Continuation-in-part of Ser. No. 602,439, Oct. 22, 1990.
[51] Int. Cl.$^6$ ................................................. G06F 17/00
[52] U.S. Cl. ......................... 364/479.03; 364/479.05; 364/479.06
[58] Field of Search ...................... 364/478, 479, 364/401, 408, 410–412, 468; 235/379, 381, 379, 381, 382, 383; 902/18, 30, 21–23, 41; 221/9

[56] References Cited

U.S. PATENT DOCUMENTS

| | | |
|---|---|---|
| Re. 32,115 | 4/1986 | Lockwood et al. . |
| Re. 33,316 | 8/1990 | Katsuta et al. . |
| 3,454,956 | 7/1969 | Icenbice, Jr. et al. . |
| 3,609,250 | 9/1971 | Morris . |
| 3,688,276 | 8/1972 | Quinn . |
| 3,705,384 | 12/1972 | Wahlberg . |
| 3,800,932 | 4/1974 | Dana . |
| 3,828,904 | 8/1974 | Naitou et al. . |
| 3,864,708 | 2/1975 | Allen . |
| 3,898,930 | 8/1975 | Ikegami et al. . |
| 3,932,036 | 1/1976 | Ueda et al. . |
| 3,943,335 | 3/1976 | Kinker et al. . |
| 3,949,375 | 4/1976 | Ciarlo . |

(List continued on next page.)

FOREIGN PATENT DOCUMENTS

| | | |
|---|---|---|
| 4602589 | 06/1990 | Australia . |
| 1278862 | 01/1991 | Canada . |
| 79302164 | 04/1980 | European Pat. Off. . |
| 83108181 | 03/1984 | European Pat. Off. . |
| 89610037 | 08/1989 | European Pat. Off. . |
| 90313917 | 04/1992 | European Pat. Off. . |
| 91309669 | 06/1992 | European Pat. Off. . |
| 2576437 | 07/1986 | France . |
| 2621153 | 09/1987 | France . |
| 8713494 | 03/1989 | France . |
| 8909224 | 01/1991 | France . |
| 59-33573 | 02/1984 | Japan . |
| 59-194263 | 11/1984 | Japan . |
| 2-27372 | 08/1988 | Japan . |

(List continued on next page.)

OTHER PUBLICATIONS

Tanaka, M. et al. "A Visual User Interface for Map Information Retrieval Based on Semantic Significance", IEEE Transaction on Software Engineering, 14(5), pp. 666–670 (May 5, 1988).

Eastman Kodak, "Photo Enlargements Via Vending Machine; Kodak Create–A–Print 35 mm Enlargement Center", 60(9), p. 12, 1988—Lexis Report, pp. 3–4.

(List continued on next page.)

*Primary Examiner*—James P. Trammell
*Attorney, Agent, or Firm*—Leydig, Voit & Mayer, Ltd.

[57] ABSTRACT

A machine is disclosed which includes an enclosure with selection and payment means on the outside thereof and with storage and handling means on the inside thereof, all coupled to computer equipment which is on the inside of the enclosure. The computer equipment is programmed to facilitate a customer's creation from among types of products to be delivered and the desired mode of personalization thereof and to deliver a completed personalized product to a receptacle from which it may be removed by the customer. The machine of the invention improves customer service and availability by periodically reporting sales and other information. In addition, the machine self detects errors of operation and provides the capability of stocking new products or software programming revisions via data transmission from a remote location.

38 Claims, 13 Drawing Sheets

U.S. PATENT DOCUMENTS

| | | |
|---|---|---|
| 3,990,710 | 11/1976 | Hughes . |
| 4,007,362 | 2/1977 | Sindermann . |
| 4,023,013 | 5/1977 | Kinker . |
| 4,034,839 | 7/1977 | Lee . |
| 4,041,467 | 8/1977 | Cota et al. . |
| 4,058,056 | 11/1977 | Rubin . |
| 4,070,698 | 1/1978 | Curtis et al. . |
| 4,085,445 | 4/1978 | Blevins et al. . |
| 4,096,933 | 6/1978 | Massa . |
| 4,144,656 | 3/1979 | Podkopaev et al. . |
| 4,160,271 | 7/1979 | Grayson et al. . |
| 4,173,024 | 10/1979 | Miller . |
| 4,190,819 | 2/1980 | Burgyan . |
| 4,193,114 | 3/1980 | Benini . |
| 4,239,380 | 12/1980 | Godshall . |
| 4,247,759 | 1/1981 | Yuris et al. . |
| 4,260,229 | 4/1981 | Bloomstein . |
| 4,261,012 | 4/1981 | Maloomian . |
| 4,275,449 | 6/1981 | Aish . |
| 4,297,724 | 10/1981 | Masuda et al. . |
| 4,300,040 | 11/1981 | Gould et al. . |
| 4,305,131 | 12/1991 | Best . |
| 4,308,017 | 12/1981 | Laughon et al. . |
| 4,319,336 | 3/1982 | Anderson et al. . |
| 4,339,134 | 7/1982 | Macheel . |
| 4,345,276 | 8/1982 | Colomb . |
| 4,354,613 | 10/1982 | Desai et al. . |
| 4,358,824 | 11/1982 | Glickman et al. . |
| 4,359,631 | 11/1982 | Lockwood et al. . |
| 4,369,082 | 1/1983 | Kerwin . |
| 4,396,307 | 8/1983 | Shah et al. . |
| 4,412,292 | 10/1983 | Sedam et al. . |
| 4,414,467 | 11/1983 | Gould et al. . |
| 4,414,896 | 11/1983 | Fischer . |
| 4,417,322 | 11/1983 | Berry et al. . |
| 4,417,722 | 11/1983 | Ishii et al. . |
| 4,418,390 | 11/1983 | Smith et al. . |
| 4,431,323 | 2/1984 | Kulow . |
| 4,434,467 | 2/1984 | Scott . |
| 4,435,772 | 3/1984 | Suzuki et al. . |
| 4,436,776 | 3/1984 | Wojcik . |
| 4,441,160 | 4/1984 | Azcua et al. . |
| 4,449,186 | 5/1984 | Kelly et al. . |
| 4,458,802 | 7/1984 | Maciver et al. . |
| 4,459,676 | 7/1984 | Oguchi . |
| 4,460,957 | 7/1984 | Eggebrecht et al. . |
| 4,463,874 | 8/1984 | Friedman et al. . |
| 4,481,590 | 11/1984 | Otten . |
| 4,484,304 | 11/1984 | Anderson et al. . |
| 4,488,224 | 12/1984 | Ippolito . |
| 4,488,244 | 12/1984 | Freeman . |
| 4,489,389 | 12/1984 | Beckwith et al. . |
| 4,495,582 | 1/1985 | Dessert et al. . |
| 4,498,139 | 2/1985 | Malinovsky . |
| 4,517,578 | 5/1985 | Tazaki . |
| 4,519,037 | 5/1985 | Brodeur et al. . |
| 4,520,451 | 5/1985 | McLaughlin . |
| 4,528,643 | 7/1985 | Freeny, Jr. . |
| 4,530,009 | 7/1985 | Mizokawa . |
| 4,542,378 | 9/1985 | Suganuma et al. . |
| 4,546,434 | 10/1985 | Gioello . |
| 4,553,222 | 11/1985 | Kurland et al. . |
| 4,559,598 | 12/1985 | Goldwasser et al. . |
| 4,567,359 | 1/1986 | Lockwood . |
| 4,575,813 | 3/1986 | Bartlett et al. . |
| 4,577,206 | 3/1986 | Hibino . |
| 4,591,983 | 5/1986 | Bennett et al. . |
| 4,596,924 | 6/1986 | Watanabe . |
| 4,598,376 | 7/1986 | Burton et al. . |
| 4,598,378 | 7/1986 | Giacomo . |
| 4,599,598 | 7/1986 | Komoda et al. . |
| 4,602,286 | 7/1986 | Kellar et al. . |
| 4,603,966 | 8/1986 | Brownstein . |
| 4,608,662 | 8/1986 | Watanabe et al. . |
| 4,610,200 | 9/1986 | Metso . |
| 4,616,926 | 10/1986 | DiPietro et al. . |
| 4,621,443 | 11/1986 | Weinreich . |
| 4,623,292 | 11/1986 | Suzuki et al. . |
| 4,625,275 | 11/1986 | Smith . |
| 4,627,015 | 12/1986 | Stephens . |
| 4,640,529 | 2/1987 | Katz . |
| 4,641,197 | 2/1987 | Miyagi . |
| 4,646,250 | 2/1987 | Childress . |
| 4,650,977 | 3/1987 | Couch . |
| 4,652,998 | 3/1987 | Koza et al. . |
| 4,654,799 | 3/1987 | Ogaki et al. . |
| 4,655,026 | 4/1987 | Wigoda . |
| 4,664,546 | 5/1987 | Runzi . |
| 4,672,554 | 6/1987 | Ogaki . |
| 4,672,683 | 6/1987 | Matsueda . |
| 4,674,041 | 6/1987 | Lemon et al. . |
| 4,674,055 | 6/1987 | Ogaki et al. . |
| 4,677,565 | 6/1987 | Ogaki et al. . |
| 4,677,570 | 6/1987 | Taki . |
| 4,683,536 | 7/1987 | Yamamoto . |
| 4,699,532 | 10/1987 | Smith . |
| 4,700,317 | 10/1987 | Watanabe et al. . |
| 4,700,318 | 10/1987 | Ockman . |
| 4,703,465 | 10/1987 | Parker . |
| 4,710,885 | 12/1987 | Litteken . |
| 4,711,543 | 12/1987 | Blair et al. . |
| 4,712,174 | 12/1987 | Minkler, II et al. . |
| 4,712,909 | 12/1987 | Oshikoshi . |
| 4,714,957 | 12/1987 | Takano . |
| 4,719,885 | 1/1988 | Nagano et al. . |
| 4,722,053 | 1/1988 | Dubno . |
| 4,723,212 | 2/1988 | Mindrum et al. . |
| 4,724,468 | 2/1988 | Bulls . |
| 4,726,697 | 2/1988 | Maedge et al. . |
| 4,727,589 | 2/1988 | Hirose et al. . |
| 4,731,743 | 3/1988 | Blancato . |
| 4,733,362 | 3/1988 | Haraguchi . |
| 4,736,306 | 4/1988 | Christensen et al. . |
| 4,740,904 | 4/1988 | Nagle . |
| 4,750,131 | 6/1988 | Martinez . |
| 4,750,151 | 6/1988 | Baus . |
| 4,760,245 | 7/1988 | Fukuya . |
| 4,764,867 | 8/1988 | Hess . |
| 4,764,880 | 8/1988 | Pearl . |
| 4,766,548 | 8/1988 | Cedrone et al. . |
| 4,766,581 | 8/1988 | Korn et al. . |
| 4,767,917 | 8/1988 | Ushikubo . |
| 4,769,694 | 9/1988 | Oshikoshi . |
| 4,771,401 | 9/1988 | Kaufman et al. . |
| 4,775,935 | 10/1988 | Yourick . |
| 4,779,080 | 10/1988 | Coughlin et al. . |
| 4,787,050 | 11/1988 | Suzuki . |
| 4,789,147 | 12/1988 | Berger et al. . |
| 4,789,907 | 12/1988 | Fischetti et al. . |
| 4,801,375 | 1/1989 | Padilla . |
| 4,811,240 | 3/1989 | Ballou et al. . |
| 4,814,592 | 3/1989 | Bradt et al. . |
| 4,817,005 | 3/1989 | Kubota et al. . |
| 4,817,043 | 3/1989 | Brown . |
| 4,818,854 | 4/1989 | Davies et al. . |
| 4,833,307 | 5/1989 | Gonzalez-Justiz . |
| 4,835,683 | 5/1989 | Phillips et al. . |
| 4,839,505 | 6/1989 | Bradt et al. . |
| 4,839,829 | 6/1989 | Freedman . |
| 4,845,635 | 7/1989 | Rosselli . |
| 4,847,473 | 7/1989 | Lee et al. . |
| 4,847,761 | 7/1989 | Ferriter . |

| | | |
|---|---|---|
| 4,847,764 | 7/1989 | Halvorson . |
| 4,852,013 | 7/1989 | Durst, Jr. et al. . |
| 4,862,376 | 8/1989 | Ferriter . |
| 4,866,661 | 9/1989 | De Prins . |
| 4,873,643 | 10/1989 | Powell et al. . |
| 4,882,675 | 11/1989 | Nichtberger et al. . |
| 4,884,199 | 11/1989 | Boothroyd et al. . |
| 4,884,212 | 11/1989 | Stutsman . |
| 4,891,660 | 1/1990 | Biondo, Jr. . |
| 4,896,208 | 1/1990 | Moriya et al. . |
| 4,896,791 | 1/1990 | Smith . |
| 4,903,815 | 2/1990 | Hirschfeld et al. . |
| 4,916,637 | 4/1990 | Allen et al. . |
| 4,918,604 | 4/1990 | Baum . |
| 4,937,439 | 6/1990 | Wanninger et al. . |
| 4,949,257 | 8/1990 | Orbach . |
| 4,951,203 | 8/1990 | Halamka . |
| 4,954,956 | 9/1990 | Yamakawa et al. . |
| 4,962,475 | 10/1990 | Hernandez et al. . |
| 4,970,655 | 11/1990 | Winn . |
| 4,982,337 | 1/1991 | Burr et al. . |
| 4,982,343 | 1/1991 | Hourvitz et al. . |
| 4,982,346 | 1/1991 | Girouard et al. . |
| 4,982,349 | 1/1991 | Cahall, Jr. et al. . |
| 4,991,108 | 2/1991 | Hamilton . |
| 4,992,940 | 2/1991 | Dworkin . |
| 4,993,587 | 2/1991 | Abe . |
| 4,999,065 | 3/1991 | Wilfert . |
| 5,007,084 | 4/1991 | Materna et al. . |
| 5,016,183 | 5/1991 | Shyong . |
| 5,017,953 | 5/1991 | Biondo, Jr. . |
| 5,018,085 | 5/1991 | Smith, Jr. . |
| 5,020,958 | 6/1991 | Tuttobene . |
| 5,025,397 | 6/1991 | Suzuki . |
| 5,025,399 | 6/1991 | Wendt et al. . |
| 5,029,099 | 7/1991 | Goodman . |
| 5,034,806 | 7/1991 | Ikeda et al. . |
| 5,036,472 | 7/1991 | Buckley et al. . |
| 5,038,293 | 8/1991 | Goodman . |
| 5,040,132 | 8/1991 | Schuricht et al. . |
| 5,042,078 | 8/1991 | Oshikoshi et al. . |
| 5,047,613 | 9/1991 | Swegen et al. . |
| 5,053,956 | 10/1991 | Donald et al. . |
| 5,056,029 | 10/1991 | Cannon . |
| 5,061,098 | 10/1991 | Engelhardt et al. . |
| 5,062,147 | 10/1991 | Pickett et al. . |
| 5,072,253 | 12/1991 | Patton . |
| 5,088,052 | 2/1992 | Spielman et al. . |
| 5,088,586 | 2/1992 | Isobe et al. . |
| 5,113,351 | 5/1992 | Bostic . |
| 5,117,283 | 5/1992 | Kroos et al. . |
| 5,119,475 | 6/1992 | Smith et al. . |
| 5,146,548 | 9/1992 | Bijnagte . |
| 5,153,825 | 10/1992 | Yauk et al. . |
| 5,172,245 | 12/1992 | Kita et al. . |
| 5,187,797 | 2/1993 | Nielsen et al. . |
| 5,235,519 | 8/1993 | Miura . |

FOREIGN PATENT DOCUMENTS

| | | |
|---|---|---|
| 1005827 | 09/1965 | United Kingdom . |
| 2050106 | 12/1980 | United Kingdom . |
| 2065412 | 06/1981 | United Kingdom . |
| 2092354 | 08/1982 | United Kingdom . |
| 2105075 | 03/1983 | United Kingdom . |
| 2119600 | 11/1983 | United Kingdom . |
| 2150728 | 07/1985 | United Kingdom . |
| 2180427 | 03/1987 | United Kingdom . |
| 2177245 | 10/1988 | United Kingdom . |
| 2208460 | 03/1989 | United Kingdom . |
| 2222341 | 02/1990 | United Kingdom . |
| 2240897 | 08/1991 | United Kingdom . |
| 2242592 | 10/1991 | United Kingdom . |
| 2246929 | 12/1992 | United Kingdom . |
| WO82/00123 | 01/1982 | WIPO . |
| WO91/09385 | 08/1982 | WIPO . |
| WO83/00628 | 03/1983 | WIPO . |
| WO83/00461 | 04/1983 | WIPO . |
| WO86/04703 | 08/1986 | WIPO . |
| WO90/07166 | 06/1990 | WIPO . |
| WO91/06913 | 05/1991 | WIPO . |
| WO92/02909 | 02/1992 | WIPO . |
| WO92/05660 | 04/1992 | WIPO . |
| WO92/17851 | 10/1992 | WIPO . |

OTHER PUBLICATIONS

Smith, M. W. et al., "The Interactive Display Design Tool: An Application Program for Human Factors Park–Task Simulation Development", IEEE, pp. 856–859 (1988).

Craven, T. C., "Adapting of String Indexing Systems for Retrieval Using Proximity Operators", Information Processing & Management, 24(2), pp. 133–140 (1988).

Meadow, C. T., "Oakdec, a Program for Studying the Effects On Users of a Procedural Expert System for Database Searching", Information Processing & Management, 24(4), pp. 449–457 (1988).

Cameron, K. L., et al., "Producing Geological Illustrations Using PC–Based Computer–Aided Drafting", Computers & Geosciences, 14(3), pp. 291–297 (1988).

Yamamoto, A., et al., "Image Retrieval System Based on Object Features", IEEE Montech, pp. 132–134 (1987).

"Products", 1 page date unknown.

Bovey, J. D. et al, "Interactive Document Display and its Use in Information Retrieval", Journal of Documentation, 43(2), pp. 125–137 (Jun. 1987).

Stefik, D. G. Bobrow, et al., "WYSIWIS Revised: Early Experiences with Multiusers Interfaces", ACM Transactions on Office Information Systems, 5(2), pp. 147–167 (1987).

Bihr, R. A., "Automated Storage and Retreival of Works Standards", Computers Ind. Engng., 13(1–4) pp. 312–316 (1987).

Biswas, Gautam, et al., "Knowledge–Assisted Document Retrieval: I. The Natural–Language Interface", Journal of the American Society for Information Science, 38(2), pp. 83–96 (1987).

Jones, P. et al., "A Language for Simple Interactive From a Database System", Data & Knowledge Engineering 2, pp. 303–321 (1987).

Croft, W. B. et al., "I³R: A New Approach to the Design of Document Retrieval Systems", Journal of the American Society for Information Science, 38(6), pp. 389–404 (1987).

Nicholas, J., et al., "Retrieval Techniques", Annual Review of Information Science and Technology, 22, pp. 109–145 (1987).

Frank, A., "Integrating Mechanisms for Storage and Retrieval of Land Data", Surveying and Mapping, 46(2), pp. 107–121 date unknown.

Restorick, F. M., "Novel Filing Systems Applicable to an Automated Office: A State–of–the–Art Study", Information Processing & Management, 22(151–172 (1986).

Crawford, R. G., et al., "A Novice User's Interface to Information Retrieval Systems", Information Processing & Management, 22(4) pp. 287–298, (1986).

Strong, G. W., et al., "A Thesaurus for End–User Indexing", Information Processing & Management, 22(6), pp. 487–492 (1986).

McDonald, N. N., "Video–graphic Query Facility for Database Retrieval", The Visual Computer, 2, pp. 72–77 (1986).

Crain News Service, "Retailers Beginning to Tune in Video Displays", Advertising Age, p. 66 (1985).

Cohill, A. M., et al., "Retrieval of HELP Information for Novice Users of Interactive Computer Systems", The Human Factors Society, Inc., 27(3), pp. 335–343 (1985).

Salton, G., e al., "Advanced Feedback Methods in Information Retrieval", Journal of the American Society for Information Science, 36(3), pp. 200–210 (1985).

Bansier, J. et al., "Filing and Retrieval of Unstructured Information: Some System Considerations", ESPRIT, pp. 295–313 (1985).

Takagi, T. et al., "A Frame-based Interface for Question-Answering Systems", IEEE, pp. 388–393 (1985).

Laender, A. H. F., et al., "An Interactive Database End User Facility for the Definition and Manipulation of Forms", pp. 41–54 date unknown.

Lyman, W., et al., "CAD Generation of Accident Diagrams for Local Agencies", pp. 657–664 date unknown.

Croft, W. B., et al., "The Use of Adaptive Mechanisms for Selection of Search Strategies in Document Retrieval Systems", Dept. of Computer and Information Science, University of Massachusetts, pp. 95–110 date unknown.

Yeazel, L. A., "Point-of-Purchase—The Decision to Buy", Pioneering Perspective, pp. 36–37 date unknown.

Creative Expressions, "Creative Expression—Bringing Feelings to Life Through Technology" Brochure (date unknown).

North DeKalb News/Sun, "Computer Lends Personal Touch to Greetings", Feb. 19, 1986

Article from PPR Magazine, p. 43, 1986.

Current Catalog© 1986.

Current Catalog© 1987.

"High Tech Bard of Greeting Cards", Nations Business, Feb. 1985, 1 page.

Card Shop Brochure, Artsci, 1986, 1 page.

The Social Secretary Brochure, 5 pages (date unknown).

"The Card/O/Mat." Brochure, 6 pages, (date unknown).

"7–Eleven to Sell Do–it–yourself Tickets"; INSIGHT, Jan. 16, 1989.

"In–store computer designs home projects" Design News, Oct. 23, 1989, p. 38.

"Now There's a Robot", Design News, Mar. 26, 1990, pp. 78–81.

Tyler, Michael, "Touchscreens: Big Deal or No Deal," *Datamation*, vol. 30, No. 1 (Jan. 1984) pp. 146–54.

Albert, Alan E., "The effect of Graphic Input Devices on Performance in a Cursor Position Task," *Proceedings of the 26th Annual Meeting of the Human Factors Society* (1982) pp. 54–57.

English, William K., Englehart, Douglas C., and Berman, Melvyn L., "Display—Selection Techniques for Text Manipulation," *IEEE Transactions on Human Factors in Electronics*, HFE–8 1 (Mar. 1967), pp. 5–15.

Shneiderman, Ben, *Designing the User Interface*, Reading MA: Addison–Wesley Publishing Co., Inc. (1987), pp. 271–282.

Hohman, Edward J., "How Computerized Cards Make This Shop 'Truly A Treat'", *Greetings Magazine*, vol. 55, No. 3, Jan. 1987, pp. 12, 13, and 24.

Date, C. J., *An Introduction to Database Systems*, vol. I, Third Edition, Reading, MA: Addison–Wesley Publishing Col., Inc. (1981) pp. 120–21.

David Balsam and Martin Kahn, *The Print Shop Reference Manual*, Copyright 1986, 1989 Broderbund Software, Inc. pp. 1–51.

McAndress, Steve, "Magical Poet Literature", pp. 1–20.

Documents published by Hallmark Cards, Inc. date unknown.

"A 'Full House' Is Dealt to the Card Party," G. Venette (PPR), Apr. 1986, pp. 42–43.

"The Computer Poet," Sales Brochure, © Oct. 1984 The Computer Poet Corporation.

"Let's Make Calendars & Stationery™," Melody Hall™, PRINTWARE Series™, © 1986 Kyocera Unison, Inc.Printmaster printout, date unknown (From Patent Office Examiner's Personal File).

"Got Something To Announce, Promote, Sell! ," 1987, G. Solomon (Family Computing, June 1987, starting at page 43).

"Create Your Own Greeting Cards," 1983, M. Adler (microcomputer software, Jan. 1, 1985, p. 655).

"Cards Offer High–Tech Greetings," 1983, T. Shea (InfoWorld, Apr. 18, 1983, starting at page 1).

Article by Kerlow entitled "The Computer As An Artistic Tool," Sep. 1984, BYTE Magazine, starting at p. 189.

Article by Cooper entitled "Computer Landscapes," Sep. 1984, BYTE Magazine, starting at p. 211.

Article by Heiser entitled "A Weaving Simulator," Sep. 1982, BYTE Magazine, starting at p. 512.

"Underware"™, 1986 catalog listing Print Custom Designs On T–Shirts . . . In Color With Your Computer And Printer!!!".

Compucards item in "What's New!" at p. 574 of the Dec. 1983 issue of BYTE Magazine.

"Comp–U–Store System Could Change Retail Economics," Jul. 1983, Direct Marketing Magazine, starting at p. 101.

"Setting Up Shop On Computer Screens," Mar. 1984, Nation's Business Magazine, starting at p. 57.

"Touchcom™ Interactive Videodisc Catalog markets Furniture at Dayton's," Sep.–Oct. 1985, Videodisc and Optical Disk, starting at p. 343.

"Retailers Beginning to Tune in Video Displays," Nov. 18, 1985, Advertising Age vol. 56, No. 90, starting at p. 66.

"These Instant–Win Games Talk Back," date unknown , Adweek's Promote, starting at p. 4.

"Cardmarketing . . . Your Way To A Powerful Database," Paul W. Corliss, Jr., Excerpt of Presentation to the Direct Marketing Assoc. 71st Annual Conference date unknown.

"The Sports Vacation Network" Sales Brochure, The Sports Vacation Network™, Research and Development by Intermark® date unknown.

"Vision 1000: The Total Promotion Delivery Vehicle," Sales Brochure, Advanced Promotion Technologies date unknown.

"Which Way To Go With Interactive Video!, " Sales Brochure, © 1987 Interac Corporation.

"Interactive Video Merchandising," Sales Brochure, ByVideo Inc. dated May 1988.

"The Right Medium The Right Moment," Sales Brochure, Advanced Interactive Video date unknown.

"Exhibit Source, Inc. Company Background," Sales Brochure, Exhibit Source, Inc. date unknown.

"Food Chain Employs Scanning Technology In Instant Win/ Prize Drawing Promotion," Incentives In Action, Premium/ Incentive Business Magazine, Starting at p. 22 date unknown.

"Roboclerk In Tune With Service Industry," Chuck Murray, Chicago Tribune, dated May 28, 1990, starting at p. 1.

Marsh, R. "Automatic Text Generation", Br Telecom Technol J., 6(4), pp. 84–88 (Oct. 1988).

Nieuenbuysen, P. "Criteria For the Evaluation of Text Storage and Retrieval Software", The Electronic Library, 6(3), pp. 160–166 9 Jun. 1988).

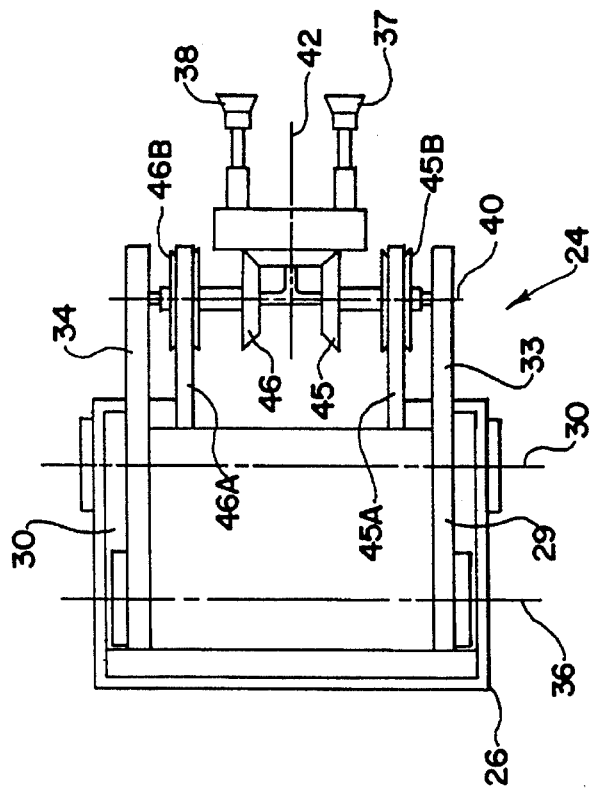
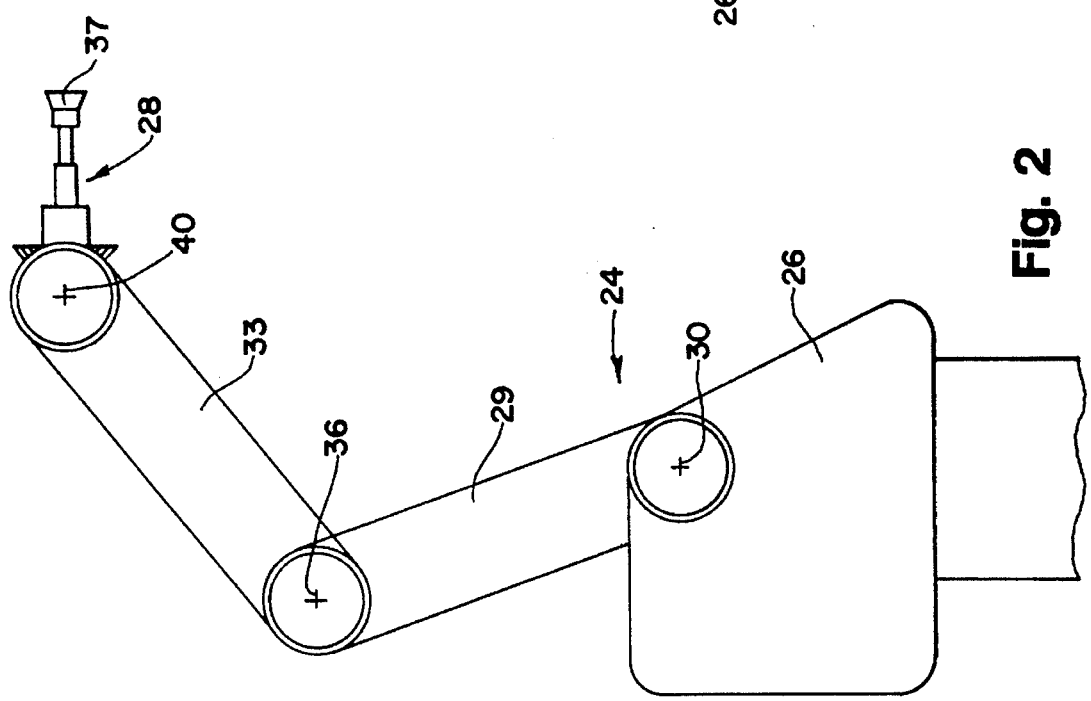

COMPUTER CONTROLLED SYSTEM FOR VENDING PERSONALIZED PRODUCTS

REFERENCE TO RELATED APPLICATIONS

This application is a continuation-in-part of an application of Buckley et al. U.S. Ser. No. 07/602,439 filed Oct. 22, 1990, and is related to subject matter disclosed in applications of Buckley et al. U.S. Ser. No. 282,013, filed Dec. 8, 1988 and issued as U.S. Pat. No. 5,036,472 ("'472"), and U.S. Ser. No. 07/735,985, filed Jul. 25, 1991. This application is also related to subject matter disclosed in an application of Banks et al. U.S. Ser. No. 514,670, filed Apr. 25, 1990. The disclosures of all of said applications are incorporated herein by reference.

BACKGROUND OF THE INVENTION

1. Field of the Invention

This invention relates to a vending machine and more particularly to an interactive machine which is usable to dispense a variety of personalized social occasion products including greeting cards and/or visual and audio media as selected by a customer.

Even more specifically, a vending machine of this invention is further programmable to detect error or malfunction conditions and low base product or ancillary supply levels and to report such conditions. Further, the vending machine generates and transmits periodic reports of sales, marketing and consumer information statistics. Finally, the vending machine receives data and control for revision of the types and attributes of products to be dispensed without a physical visit to the vending machine. At the same time, the vending machine is reliable, efficient and fast in operation and is manufacturable at relatively low cost.

2. Background of the Invention

As discussed in the introductory portion of the specification of the aforementioned related applications, U.S. Pat. Nos. 3,892,427 and 3,982,744 disclose methods for the production of personalized "ME" books in which, for example, the name of a child who is to receive a story book is printed in the text of a story book. In the production of such books, a computer was used to control a printer to print variable data on preprinted sheet material to form sheets which were bound together in a separate operation to provide the final hard cover book product. As disclosed, many types of variable data could be stored in the computer and such variable data may include quality control indicia which may include check bars or other graphics.

The Rosewarne et al. U.S. Pat. No. 4,616,327 discloses methods similar to those disclosed in the "ME" book patents and the printing of specific types of graphics including pictorial figures having physical characteristics similar to personalized data introduced into the system. A standard microprocessor is programmed to provide storage and combining functions after personalized data is introduced into the system by temporary storage by the purchaser or user on a storage medium such as a punched card. One or more plotters are used for producing the final product, an eight pen plotter being disclosed.

The aforesaid Buckley et al. '472 patent discloses a machine for vending greeting cards and similar social occasion personalized products. The machine is readily operable by a customer without assistance to obtain personalized or customized products of his or her choice. The machine includes means for displaying identifications of available products and desirable attributes and features thereof and of modes of selection such as to facilitate selection of products and the desired attributes and features by the customer, and provides a flexible manufacturing platform. This flexible platform allows for quick changes of product storage means to allow different products to be manufactured to customer's preferences.

More particularly, the machine of the Buckley et al. '472 patent includes an enclosure with selection and payment means on the outside thereof and with product storage and handling means on the inside thereof, all coupled to a computer which is on the inside of the enclosure. The computer is programmed to deliver a selected product to a receptacle from which it may be removed by the customer. Preferably, available products and their desirable attributes and features are identified both audibly and visually and the computer is programmed to control presentation of a sequence of images and associated sound. In accordance with an important feature, the computer controls a general presentation of a series of descriptions of available products and their features with instructions as to initiating use of the machine. When a customer initiates use of the machine, the computer then controls presentations of specific instructions to the customer to make it possible to make selections easily, quickly and accurately. After a customer's selections are effected, the computer again controls the general presentation and repeats it until another customer's use is initiated. Thus the audible and visual capabilities of the machine are used to maximum advantage.

In an illustrated embodiment of the Buckley et al. '472 patent, the images are presented on a CRT screen which is also usable as a touch screen for selection of the desired product and the desired features and attributes thereof. The touch screen or a keyboard or other input device may be used, for example, to select from among a number of different birthday cards and to enter the name and birth date of the intended receiver, the name of the sender and other personalized data.

After a customer selects and pays for a greeting card or other product, a data entering mode may be initiated in which he or she is asked to enter data or otherwise select the form of the final product, as by entering the names of the receiver and sender of a birthday card, for example. The data entering mode may further include operations for viewing and correction of entered data.

Many vending machines have heretofore been provided for vending of cans, bottles, hot and cold liquids in cups, sandwiches, candy, combs, and various other products, each machine being typically designed to handle only products which have a physical size and shape within a certain limited range. For example, one of such machines is disclosed in the Ogaki et al. U.S. Pat. No. 4,677,565 and is designed for vending of a computer program selected by a customer from menus displayed on a screen, the selected program being recorded on a tape cassette or floppy disc inserted into a tape or disc drive of the machine.

Problems commonly associated with vending machines by consumers frequently arise, however, when (1) the machine is out of the product which the consumer wishes to purchase or is unable to create the product which the consumer wishes to purchase; (2) the machine is unable to make change; (3) the machine is out of order; or (4) the machine has no product which the customer is currently interested in purchasing. In all of these situations, the customer cannot or will not make a purchase. Most common vending machines attempt to remedy this problem by having a service person visit the machine daily. However, if the machine becomes inoperative shortly after a visit by a service person, an entire day's sales are lost. In high traffic areas, the volume of lost sales can be very damaging to profitability of the machine.

SUMMARY OF THE INVENTION

Therefore, an object of the invention is to provide a machine which overcomes the deficiencies of the prior art.

An additional object is to provide a machine which is capable of periodically reporting sales and other information to a remote location to enable adequate stocking of base products in the machine.

A further object of the invention is to provide a machine which is capable of periodically reporting sales and consumer survey information to a central location to enable rapid response to changing consumer likes, dislikes, and desires.

Still another object of the invention is to provide a machine which is capable of self detection of errors arising during operation and which, upon such self detection, is capable of self reporting those errors to a remote location for rapid response and correction of such errors.

An additional object of the invention is to provide a machine which is capable of being electronically stocked with new types and attributes of products to be dispensed including providing various new engaging graphical demonstrations to encourage customer purchases as well as being capable of having software controlling the operation of the machine updated from a remote location.

In accordance with the invention, these and other objects are provided in a machine which incorporates features of the aforesaid Buckley et al. '472 patent and related applications and additionally is capable of 1) self-detection of error conditions, 2) maintaining and periodically reporting sales and consumer survey information, and 3) being electronically stocked with digital information from a remote location.

A machine constructed in accordance with the invention preferably includes an enclosure with selection and payment means on the outside thereof and with storage and handling means on the inside thereof, all coupled to computer equipment which is on the inside of the enclosure. The computer equipment is programmed to facilitate a customer's creation from among types of products to be delivered and the desired mode of personalization thereof and to deliver a completed personalized product to a receptacle from which it may be removed by the customer. The machine of the invention improves customer service and availability by periodically reporting sales and other information. In addition, the machine self detects errors of operation and provides the capability of stocking new products or software programming revisions via data transmission from a remote location.

The invention may be utilized for manufacture of social occasion products such as personalized greeting cards from "white paper", i.e. base product which is paper stock of any color and of any weight and in sheet or roll form, particularly including, for example, heavy paper stock or cardboard such as 59 pound stock used for high quality greeting cards. To provide a completed card, the machine imprints on such stock both graphics and text as selected by a customer to provide a personalized card of very high quality.

Additionally, should a customer not have time to input the necessary information to achieve a personalized card, the customer may select a standard card design which requires no personalization prior to being printed. Further, the customer may select a card designed for personalization and allow the machine to select personalizing indicia suitable to any customer. Either of these two nonpersonalized card selections results in a card of high quality being available to the customer without the expensive and space consuming selection racks typical to card shops.

With this arrangement, all stock is used. No expensive preprinted forms which might go unused are wasted. Another very important advantage is that a great many graphics and text formats may be permanently stored in digital form as on hard discs, tape, laser disc or CD ROMs, to provide customers with much wider selections of graphics and text formats. And in keeping with an object of the invention, utilizing writable storage media to store graphics and text formats enables new graphics and text formats to be transmitted to the machine electronically from a remote location without the need of a service visit to the machine itself.

A machine of the invention preferably retains a number of advantageous features as disclosed in the aforesaid prior applications. For example, available products and their desirable attributes and features are identified both audibly and visually through presentation of a sequence of images and associated sound to present a series of descriptions of available products and their features with instructions as to initiating use of the machine. When a customer initiates use of the machine, he or she is then supplied with specific instructions to make it possible to make selections easily, quickly and accurately.

Preferably, images are presented on a display means such as a CRT screen which is also usable as a touch screen for selection of the desired product and the desired features and delivery of products. For example, data transfers take place while transfers of a sheet are being effected and, while printing or other modifications are taking place, other required operations may take place, such as the delivery of an envelope and a bag to a delivery section. The result is that the time required to produce the final product is minimized.

Specific features of the invention relate to the production of social occasion products such as greeting cards on base product consisting of plain greeting card stock with color graphics and text to produce cards which are of high quality and very attractive and which are selected by customers from a wide variety of possible designs and formats and which are imprinted with text selected by customers for personalization thereof. These features relate to the adaptation of a color printer for reliable printing on greeting card stock, to the handling of greeting card stock and to the selection of graphics and text by customers.

In an illustrated embodiment, a high quality color ink jet printer is used advantageously which is of a known type and which is capable of printing a sheet of standard weight and width card stock. Readily understood is that the invention is not limited to the use of a particular color printer. Both traditional printers as well as solid ink jet, water base ink jet, and solvent base ink jet, thermal wax, dye diffusion, diffusion, erosion, laser, and other printers as well as pen plotters and pencil plotters may be adapted for use. Further, a printer which prints on only one side of paper or a printer capable of printing on both sides of a piece of paper simultaneously may be used. In addition, color or black and white printing technology may be used. Finally, printers in which paper is supplied in roll rather than sheet form may be used.

These and other features provide a system which is highly flexible and versatile, capable of meeting the desires of customers and reliably providing final products of uniform high quality and at reasonable cost.

This invention contemplates other objects, features and advantages which will become more fully apparent from the following detailed description taken in conjunction with the accompanying drawings.

BRIEF DESCRIPTION OF THE DRAWINGS

FIG. 2 is a side elevational view of a robot used in handling of products within the machine of FIG. 1;

FIG. 3 is a top plan view of the robot of FIG. 2;

DESCRIPTION OF PREFERRED EMBODIMENTS

Figure 1:
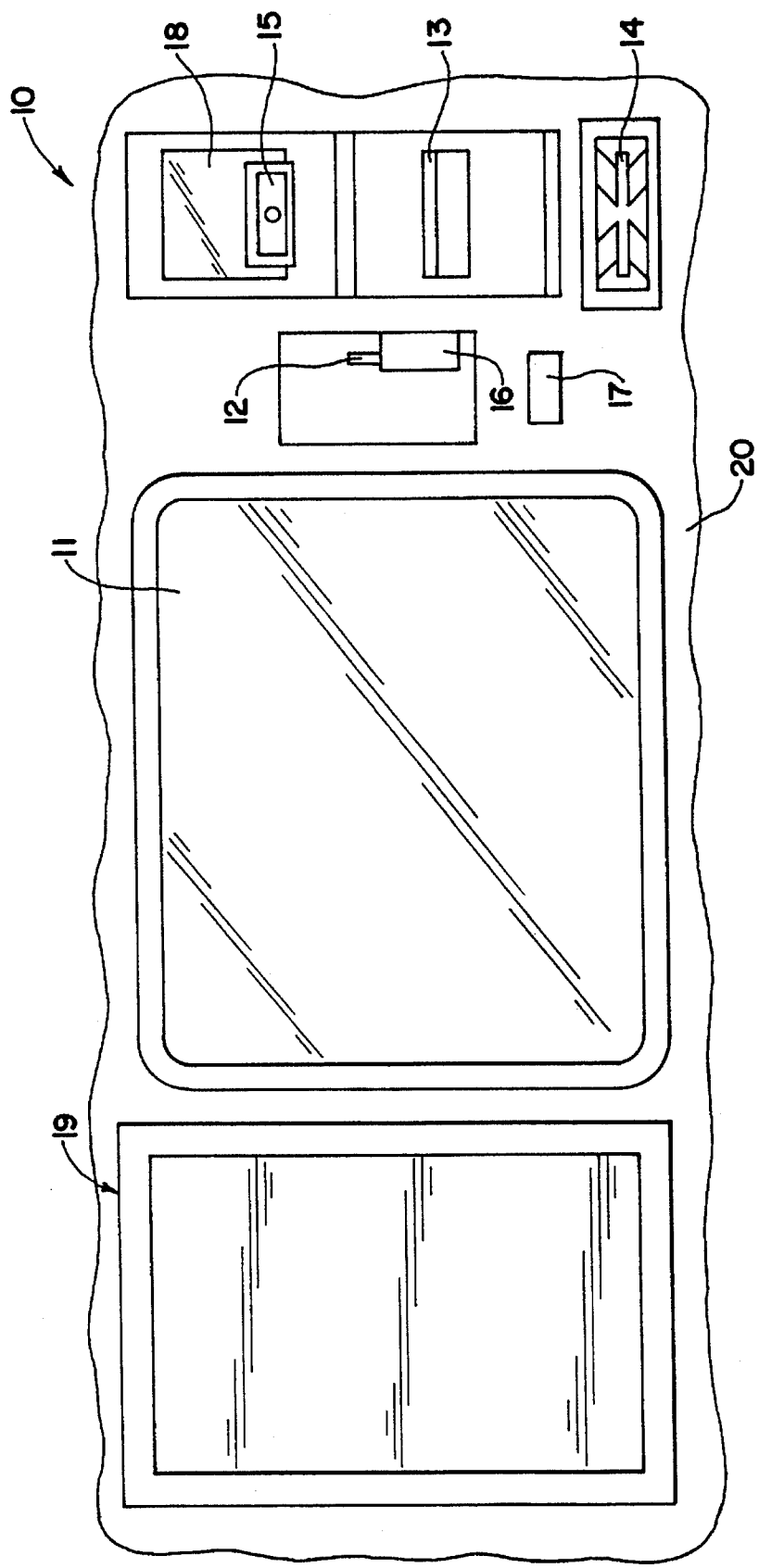
FIG. 1 shows a front panel portion of a vending machine constructed in accordance with the invention.

Reference numeral 10 generally designates a vending machine which is constructed in accordance with the principles of this invention and which is particularly designed for vending personalized greeting cards but which may be used for vending of other personalized products.

The machine 10 includes display means including a screen 11 which in accordance with the invention is operable to present visual illustrations in color to enable a customer to select from among a large number of available greeting cards or other products and to enable the customer to select text and other modifications as may be desired for personalization of the selected card or product. The display means also includes voice generating means for providing an audible presentation correlated to the visual presentation.

In an introductory presentation mode, such display means are operable to present a sequence of identifications of the available products and desirable attributes and features thereof to persons in the vicinity of the machine 10. Operating instructions are also presented in the introductory presentation mode.

By way of example, the machine 10 may be used to vend products including get-well, birthday, anniversary, Easter, Passover, Hanukkah, Christmas cards and other types of greeting cards. In each case, a personalized message may be printed along with the name of the recipient of the card and the name of the sender of the card.

In the illustrated embodiment, the screen 11 is operable as a touch screen for selection of the product and attributes thereof and for entering of name, date and personalized message data where a personalized product is selected. The customer is invited to touch a portion of the screen to indicate an intention to consider purchase of a selected one of the available products and is then instructed audibly through voice generating means and visually through the screen 11 to effect a conditional pre-payment for the product, payment being conditioned upon the customer's final approval of the product. Upon the failure of a customer to touch the screen 11 in the appropriate place, the introductory presentation mode is repeated.

Pre-payment may be effected by insertion of coins in a coin slot 12, insertion of a bill in a bill receiving slot 13 or momentary insertion of a credit card in a credit card reader slot 14. Upon entry of selection and personalization data, as hereinafter described, the customer is invited to indicate final approval of a product by pressing a "buy" button 15. At this time, as well, the product selected for purchase is shown on the screen 11 for visual verification. The change cup 16 is provided for return of coins made as prepayment and delivering any change which may be due. A refund button 17 is also provided and a small read-out display 18 may either be associated with the payment receiving devices or preferably is displayed on the screen 11.

A delivery receptacle 19 is provided into which the selected product is delivered, along with envelope or other required associated materials. The delivery receptacle 19, the screen 11, coin slot 12, and payment effecting devices are positioned on a front panel 20 of a housing 22 as generally shown in FIGS. 4 and 5.

In one embodiment, a robot 24 within the housing 22 operates to effect transfers of base product, such as greeting card stock, as required to effect personalization of a product in accordance with data supplied by a customer. Depending upon the type and variety of base products to be used, a paper feed assembly rather than a robot may be used to effect transfers of base product as required to effect personalization of a product in accordance with data supplied by a customer. Those skilled in the art will recognize that various standard automation devices in addition to the use of a robot are within the scope of the invention.

Where a robot is utilized, a suitable robot 24 is a commercially available type of robot of a type sold by Eshed Robotic, Inc. of Princeton, N.J. and includes electro-mechanical components which are not shown in detail. Such components are responsive to applied electrical signals to accurately control rotation of the turret head 26 about a vertical axis, rotation of links 29 and 30 about the horizontal axis 32, rotation of the links 33 and 34 about the horizontal axis 36 and rotation of the transfer head 28 relative to the links 33 and 34 about the axes 40 and 42.

Figure 4:
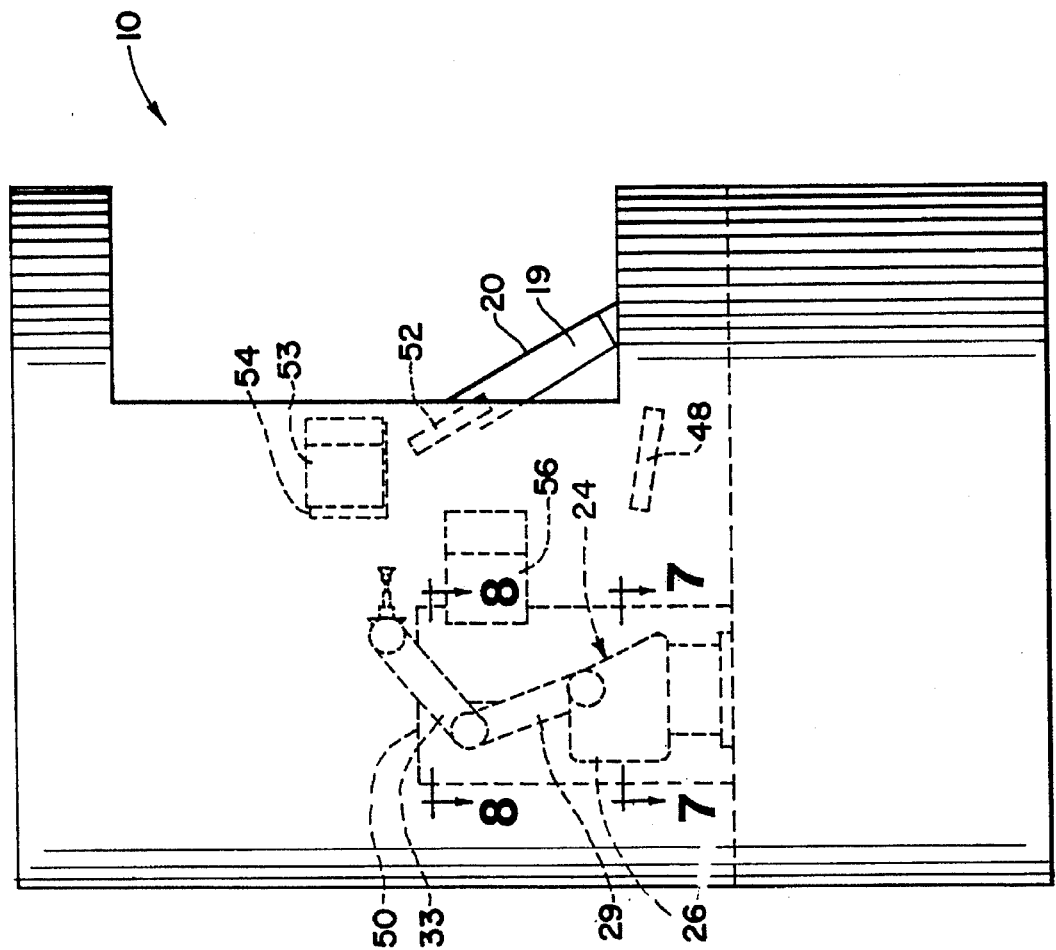
FIG. 4 is a side elevational view of the machine of FIG. 1, illustrating diagrammatically the positions of the robot of FIGS. 2 and 3 and other components within the machine.
Figure 6:
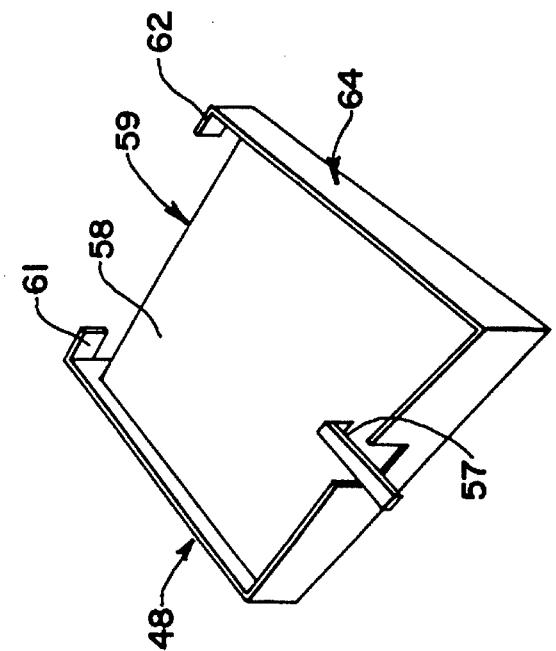
FIG. 6 is a perspective view illustrating a blank card supply and feeder section of the machine of FIG. 1.
Figure 5:
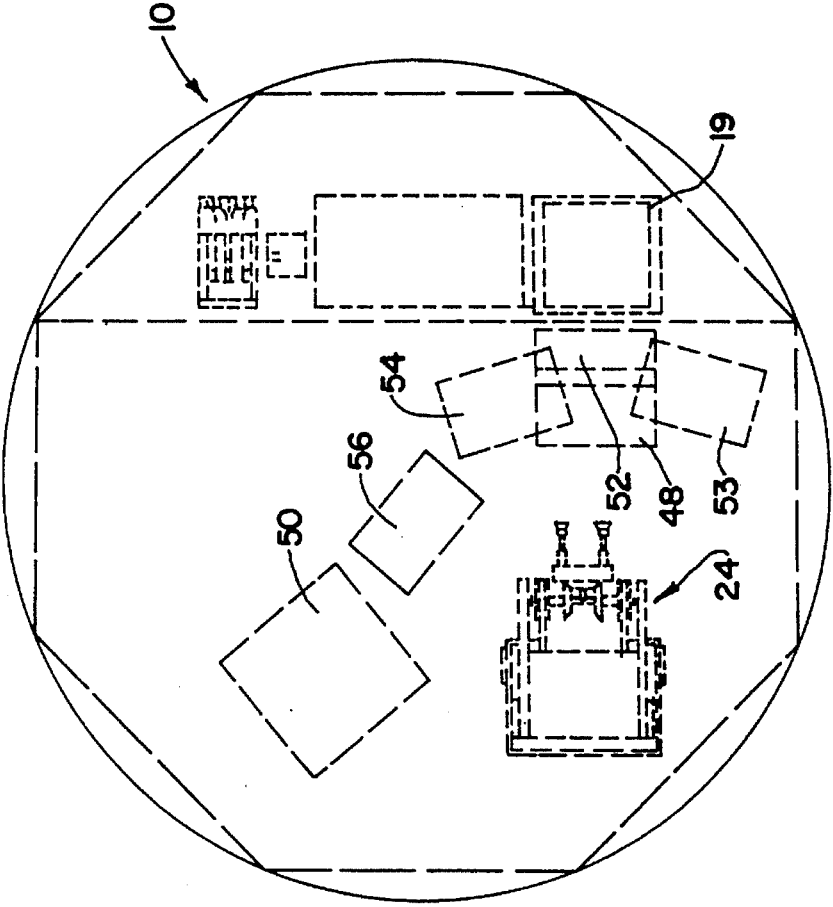
FIG. 5 is a top plan view corresponding to FIG. 4.

The position of the robot 24 and the positions of other components within the housing 22 are indicated diagrammatically in dotted lines in FIGS. 4 and 5. In brief, the transfer head 28 of the robot 24 of the illustrated machine 10 is operated to pick up a sheet of greeting card stock from a blank card supply and feeder unit 48 and thereafter inserts the sheet into a feeder slot at the lower end of the printer 50, picks up the sheet after printing on one side thereof, reinserts the sheet into the printer 50 for printing on the opposite side thereof, transfers the sheet to a decurling assembly associated with the printer 50, picks up the decurled sheet from the decurling assembly, and thereafter transfers the sheet to a delivery station 52.

While printing operations are taking place, the transfer head 28 is operated to transfer an envelope and a bag from envelope and bag supply stations 53 and 54 to the delivery station 52. The printed sheet, envelope and bag are then dropped downwardly from the delivery station 52 to the delivery receptacle 19 to be picked up by the customer.

Figure 7:
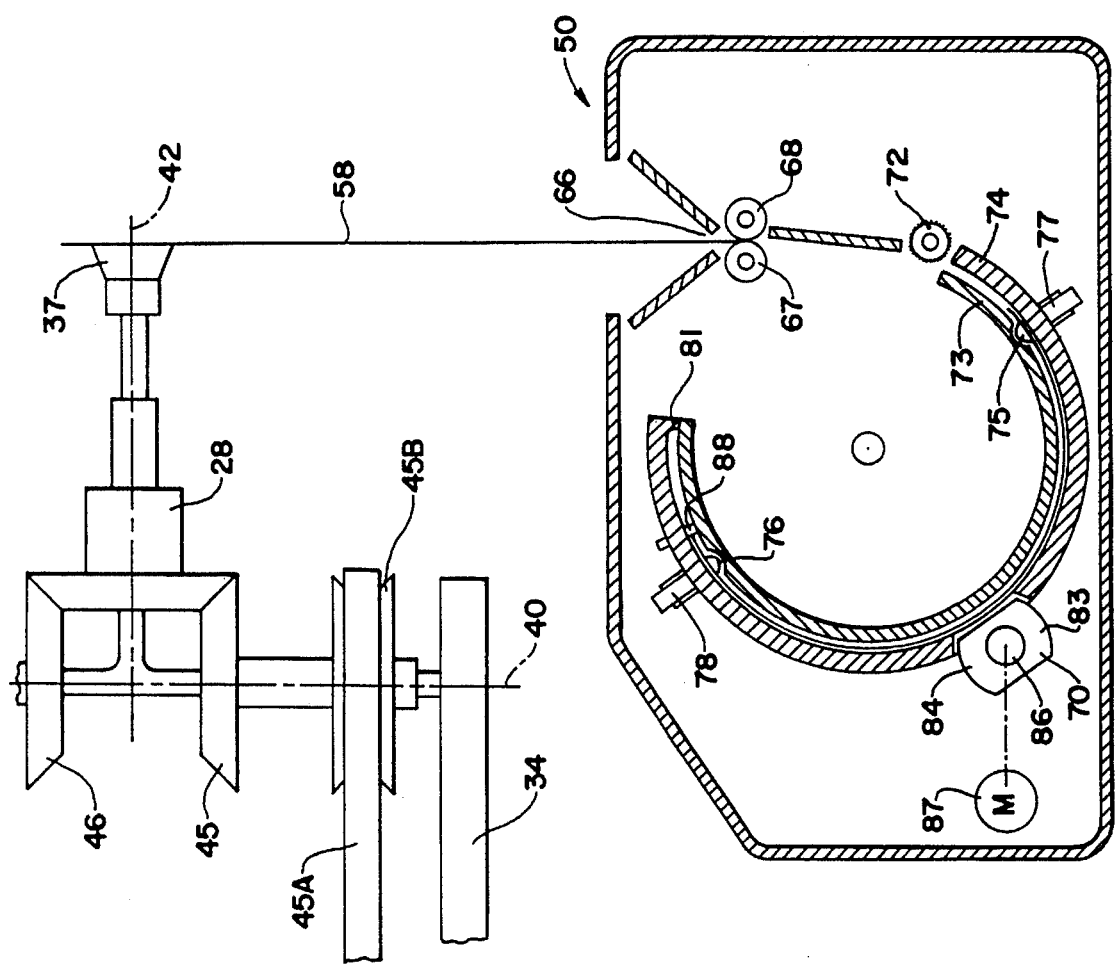
FIG. 7 is a cross-sectional view of a lower portion of a printer of the machine of FIG. 1, looking downwardly at a level as indicated by line 7—7 of FIG. 4, also showing the feed of a sheet to the printer by the robot.

FIG. 7 is a cross-sectional view of a lower portion of the printer 50, looking downwardly at a level as indicated by line 7—7 of FIG. 4, also showing the feed of sheet 58 to the printer by the robot 24. The illustrated printer 50 includes portions of a known type of ink jet color printer manufactured by Howtek, Inc. of Hudson, N.H. and disclosed in U.S. Pat. Nos. 4,591,281 and 4,714,936, the disclosures of which are incorporated by reference.

A second type of ink jet printer (not shown in Figures) which also may be used in the machine 10 of the invention is a Phaser™ III RX marketed by Tektronix, Inc. of Beaverton, Oreg. Highly attractive color printing of computer generated graphics and text may be achieved with printers of these types.

The embodiment using the Phaser™ III RX printer and only a single base product, such as a blank card stock, to produce the various products, such as various social occasion cards, eliminates the use of a robot. Rather, a sheet handling system may be used in place of the robot to effect feeding of blank card stock, transfer of envelopes to the customer, reversing of the card stock after printing of the first side to enable printing of the second side, and feeding of the completed card to the customer.

In the illustrated machine of the invention, modifications of the printer 50 are made to obtain reliable automated operation and to print on both sides of blank greeting card stock which is relatively thick and which has a width substantially less than that of conventional paper. These modifications are disclosed in the previously mentioned parent application U.S. Ser. No. 07/602,439 filed Oct. 22, 1990 of this continuation-in-part application.

Figure 8:
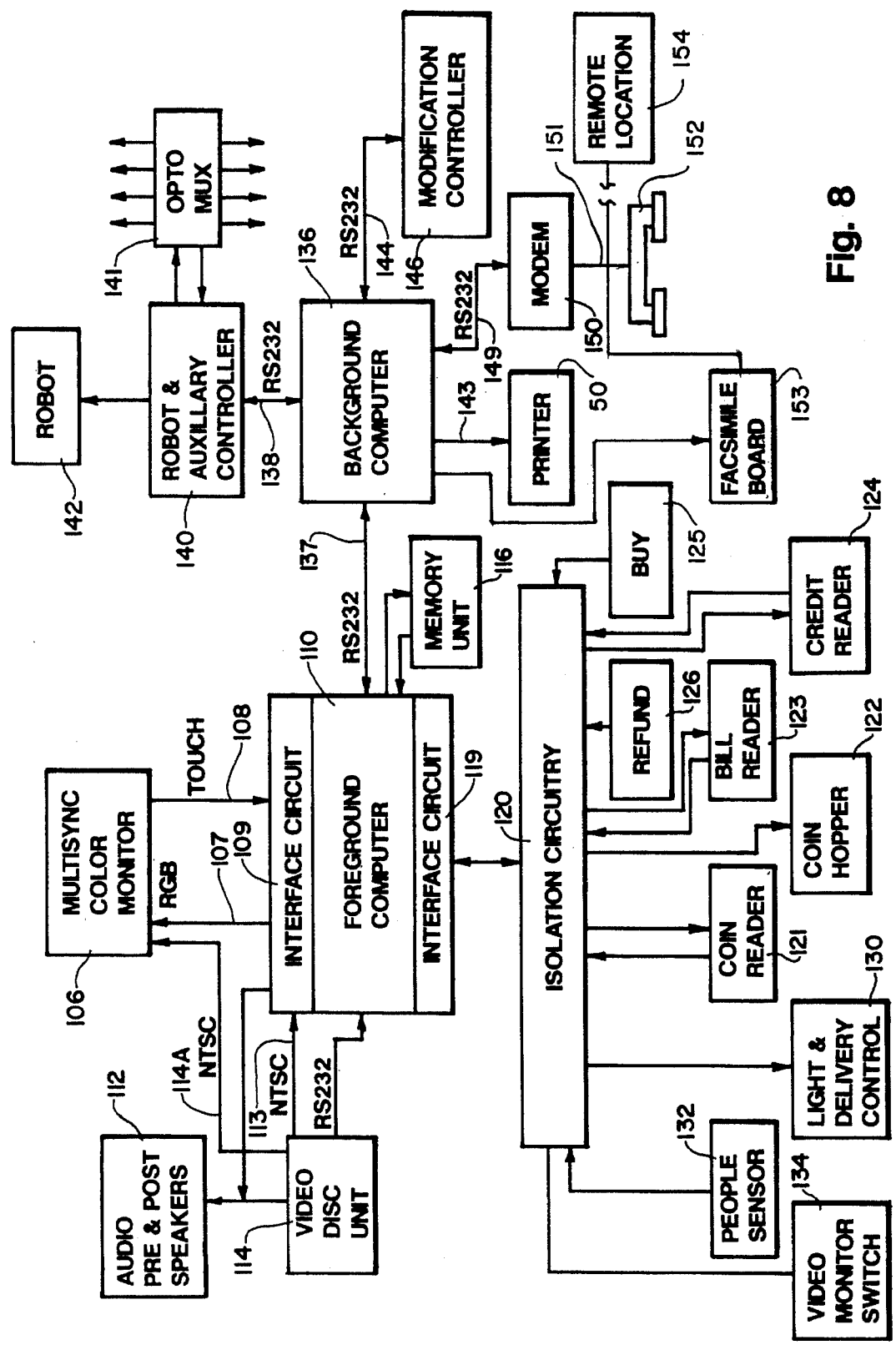
FIG. 8 is a schematic block diagram illustrating a foreground computer, a background computer and other circuitry of the machine.

FIG. 8 is a schematic block diagram of the control system for visual and audio presentations and control of making of a personalized product as selected by the customer in the embodiment where a robot is used. The presentation screen 11 of FIG. 1 is provided by a monitor 106 which is connected through a video drive cable 107 and a touch signal transmission cable 108 to an interface circuit 109 of a "foreground" computer 110, operative to control presentation and control operations directly associated with the customer. To control operation of the base product manipulation and feeding means, such as the robot 24, and the printer 50, a separate "background" computer 136 is provided. Those skilled in the art will understand that the terms backgound computer and foreground computer may be used to refer to two separate and distinct computers or to a single computer capable of parallel processing.

Interface circuit 109 also operates to transmit an audio signal through a cable 111 to a speaker unit 112 and to receive a NTSC signal through a cable 113 from an optical disc unit 114, or other suitable storage media such as CD-ROM, writable compact disc or hard disk. The NTSC signal is then manipulated by the interface circuit 109 and transmitted via cable 107 to the monitor 106. The interface circuit 109 is such that the optical disc unit 114 is controllable from the foreground computer 110 through a RS232 serial link 115 to supply signals to develop displays of a very large number of color graphics stored on an optical disc, or other suitable storage device such as CD-ROM, writable compact disc or hard disc, and from which the customer may select one suitable for personalization of a card. A direct connection 115 is provided between optical disc unit 114 and the speaker unit 112 for developing an audio signal corresponding to the display developed by monitor 106 from the transmitted video signal.

For printing of color graphics corresponding to the graphics produced from the video disc or other storage device, data for producing corresponding CMYK signals are stored in a memory unit 116 which may be a hard disc drive unit, for example. It will be understood that the invention is not limited to any particular form of media, either optical or magnetic or otherwise, for storing of graphics and other data.

For transmitting and receiving control signals to and from the control panel, an interface circuit 119 of the foreground computer 110 is connected through isolation circuitry 120 to a coin reader 121 which provides the coin slot 12, to a circuit 122 which controls delivery of coins to the change cup 16, to a bill reader 123 which provides the bill receiving slot 13, to a credit card reader 124 which provides the credit card receiving slot 14, and to switch units 125 and 126 controlled by the buy and refund buttons 15 and 17.

As shown, the isolation circuitry 120 is also connected to a unit 128 which controls operation of release devices of the delivery unit 52 to release an assembly of a completed card and associated envelope and bag to fall into the delivery receptacle 19. In addition, the isolation circuitry 120 may be connected to a people sensor 132 which senses the presence of anyone in proximity to the machine, and to video monitor switch 134 which controls the monitor 106 to operate either from RGB or other color signals applied through the cable 107.

To control operation of the robot 24 and the printer 50, a separate "background" computer 136 is provided in the illustrated machine 10 which is connected through a RS232 serial link 137 to the foreground computer 110, through a RS232 serial link 138 to a controller 140 which is connected through interface and drive control circuits 141 and 142 to sense and control movements of the robot 24, supply of vacuum to the vacuum cups 37 and 38 of the transfer head 38 and control other operations including the energization of drive motor 87 for the kick roller 70 (FIG. 7), the energization of the motor 100 of the decurl assembly (FIG. 9) and the operation of the delivery unit 52. The background computer 136 is also connected through a parallel bus 143 to the printer 50 and through a RS232 serial link 144 to a controller 146 for the modification station 56.

In accordance with the subject invention, the background computer 136 is connected through a RS232 serial link 149 to a modem 150. The background computer 136 is also connected, via an expansion slot, to a facsimile board 153. The modem 150 and the facsimile board 153 are each connected to a telephone line 151 for transmission of data or monitoring of machine operation at a remote location 154, as well as servicing or control of the machine from the remote location. Use of the facsimile board enables the machine 10 to contact the remote location 154 either by (1) transmitting data directly to a facsimile machine or (2) transmitting data to any suitable receiver capable of receiving and utilizing facsimile telephone transmissions, such as another computer which is also equipped with a facsimile board.

The modem 150 enables the machine 10 to transmit data to a receiver at the remote location 154. The modem 150 also enables the machine 10 to receive data from the remote location 154. Such a receiver preferably is a "pager" or "beeper" of the type capable of visually displaying numeric figures transmitted thereto. Two such suitable pagers are the Facts Courier™ pager marketed by NEC America, Inc. and the Airsignal SM™ pager marketed by Motorola. Additionally, the receiver may include a remote computer equipped with a modem or other suitable data communication capability as will be understood by those skilled in the art. As diagrammatically shown, a handset 152 is optionally connected to the remote location 154 via the telephone line 151 for transmitting voice signals thereto.

Figure 9:
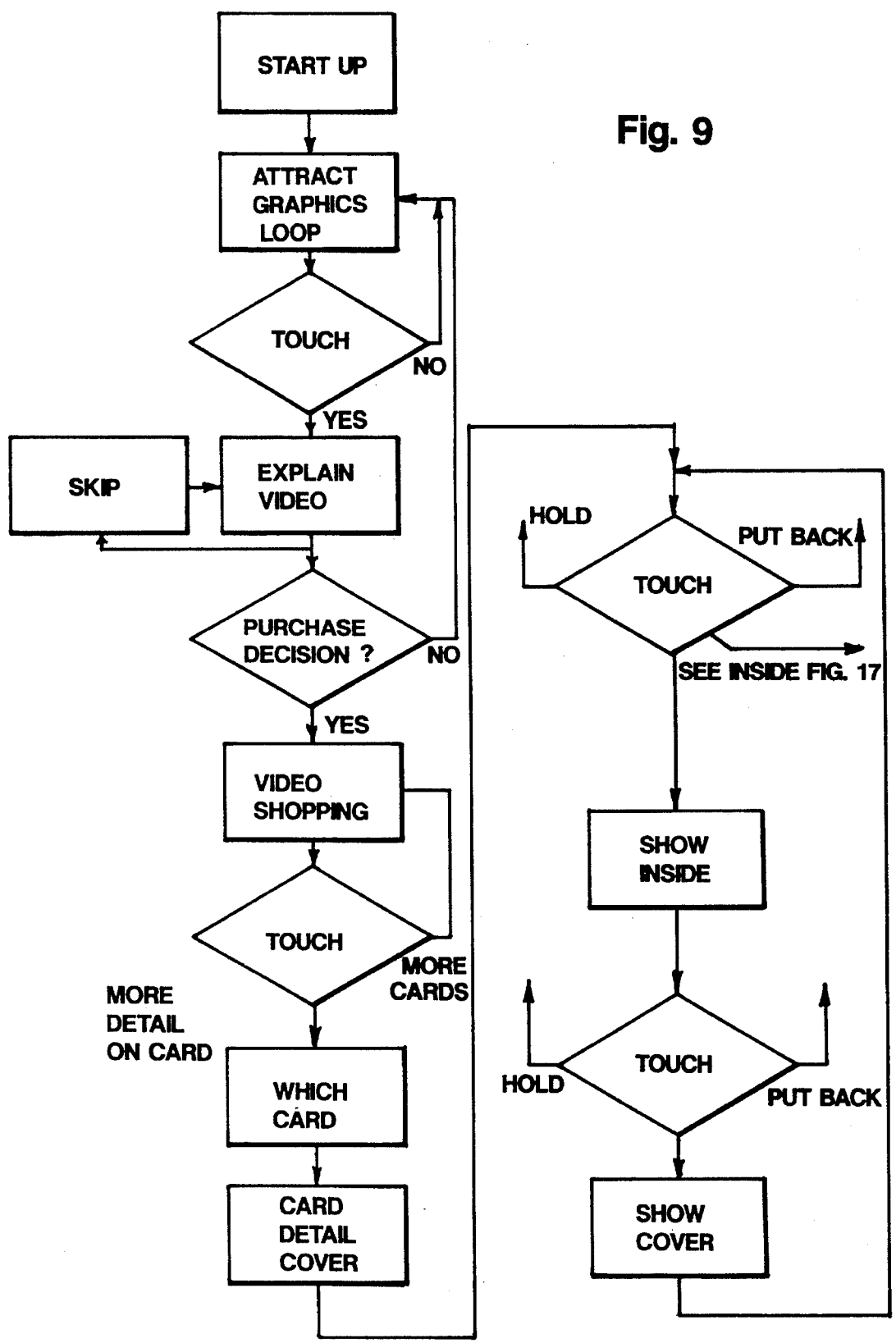
FIGS. 9 and 10 are flow diagrams illustrating the operation of the foreground computer shown in FIG. 10.
Figure 10:
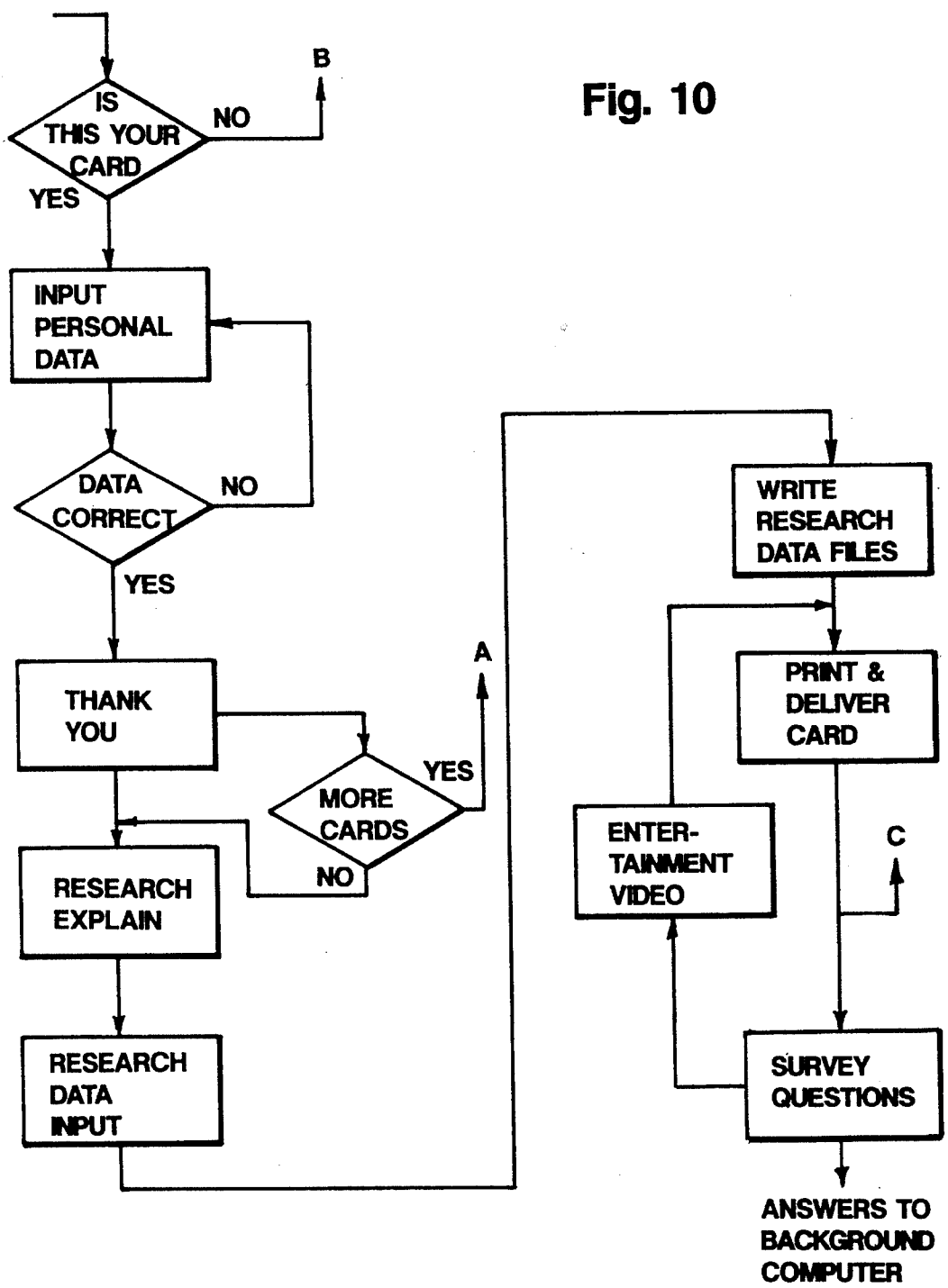

The operation of the presentation or foreground computer 110 is depicted in the logical flow charts of FIGS. 9 and 10. As shown, at start-up, graphics displays are generated to alert customers in the vicinity of the machine 10 as to products available from the machine and to instruct a customer as to how to learn about the products and the mode of operation of the machine. The displays include a message inviting the customer to touch the screen to obtain more information as to operation of the machine and more detailed information as to available products.

Upon touching the screen 11, the system advances to a decision block where an explanatory video is generated with associated sound. The customer is invited to make a revocable decision to consider purchase of a product, by touching a selected area of the screen 11. If the screen is not touched after a certain time interval, the operation reverts to the start condition. If the customer decides to consider a purchase, the system advances to an "explain video" block wherein a video shopping program is initiated in which, for example, the customer is invited to select from a number of categories.

For example, if the customer selects the birthday card category, he or she may then be invited to select between categories of cards. More and more cards may presented until the customer finds one which is suitable. Then more detail is provided, including full screen high resolution images of the cover and inside of the card. Once the customer finds a card to his or her liking, the buy button 15 (FIG. 1) is pressed and an operation is then initiated for selection of personalized data. This operation is similar to that disclosed in the aforementioned Banks et al. application U.S. Ser. No. 514,670, filed Apr. 25, 1990, the disclosure of which is incorporated by reference.

Should a customer not have time to input the necessary information to achieve a personalized product such as a personalized greeting card, the customer is instructed audibly through voice generating means and visually through the screen 11 that the customer may select a standard card design which requires no personalization prior to being printed. Further, the customer is instructed audibly through voice generating means and visually through the screen 11 that the customer may select a card designed for personalization and allow the machine to select personalizing indicia suitable to any customer. Either of these two nonpersonalized card selections results in a card of high quality being available to the customer without the expensive and space consuming selection racks typical to card shops.

After the customer indicates final approval of a card, operation is initiated to print the card, data stored in the RAM of the foreground computer 110 and in the memory unit 116 being transferred to the background computer 136 through the serial link 137. The aforedescribed printing and associated assembly operations are then initiated under control by the background computer 136. At this time, the customer is informed through video and audio presentations as to the expected time before the card will be completed and is invited to participate in supplying marketing and consumer information as his or her sex, age, etc. as well as similar information concerning the recipient of the card, and any comments which the customer may wish to convey.

As the customer answers the marketing and consumer information questions, the data is stored directly to the background computer 136 for later use. Then, if time remains, an entertainment video may be presented until the card has been completed and delivered. Preferably, this entertainment video may be bypassed so that a consumer may immediately begin shopping again. Such a bypass is preferably effected by use of the video touch screen.

Figure 11:
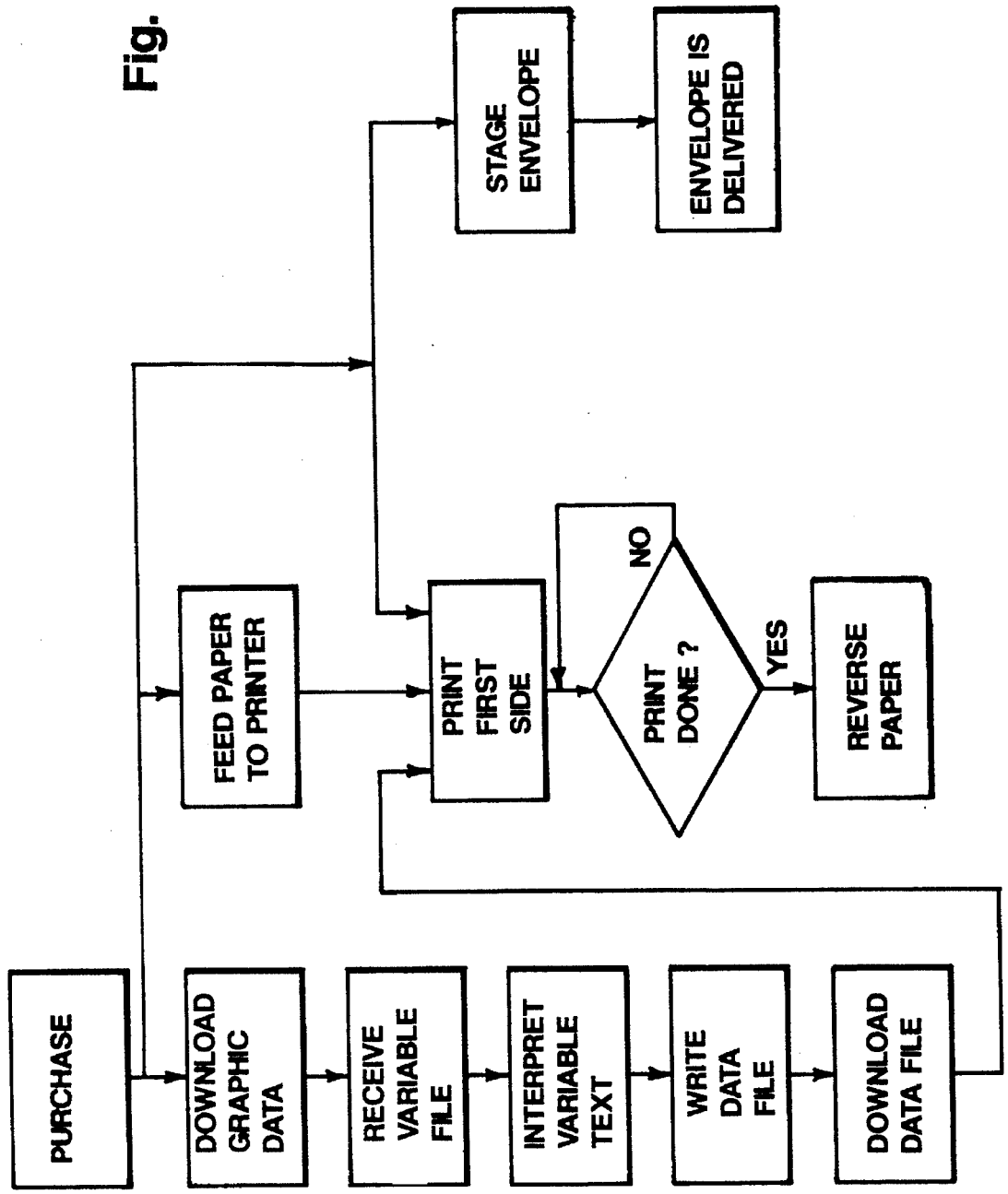
FIGS. 11, 12, 13, 14, and 15 are flow diagrams illustrating operations of the background computer shown in FIG. 10.

General operations of the background computer 136 are illustrated in the flow diagrams of FIGS. 11, 12, 13, 14, and 15 which are generally self-explanatory. As shown in FIG. 11, once the consumer has decided to make a purchase, the background computer 136 downloads the graphical data and causes base product such as greeting card stock to be loaded into the printer 50. Where a personalized product is selected by the consumer, the background computer 136 then receives a variable file created by the personalization entered by the consumer, interprets that text, writes a first data file, and then downloads that data file to print the first side of a personalized product such as a greeting card.

Should the customer select a personalizable product but not wish to enter personalizing data, a data file created to replace a variable file created by the personalization entered by the customer is accessed by the background computer 136 which is then downloaded to print the first side of a nonpersonalized product such as a greeting card. Should the customer select a nonpersonalizable product, the data file associated with that product is accessed by the background computer 136 and that file is then downloaded to print the first side of a nonpersonalized product such as a greeting card. Following transfer of either of the three data files described above, the envelope for the personalized product is staged for delivery to the customer.

Figure 12:
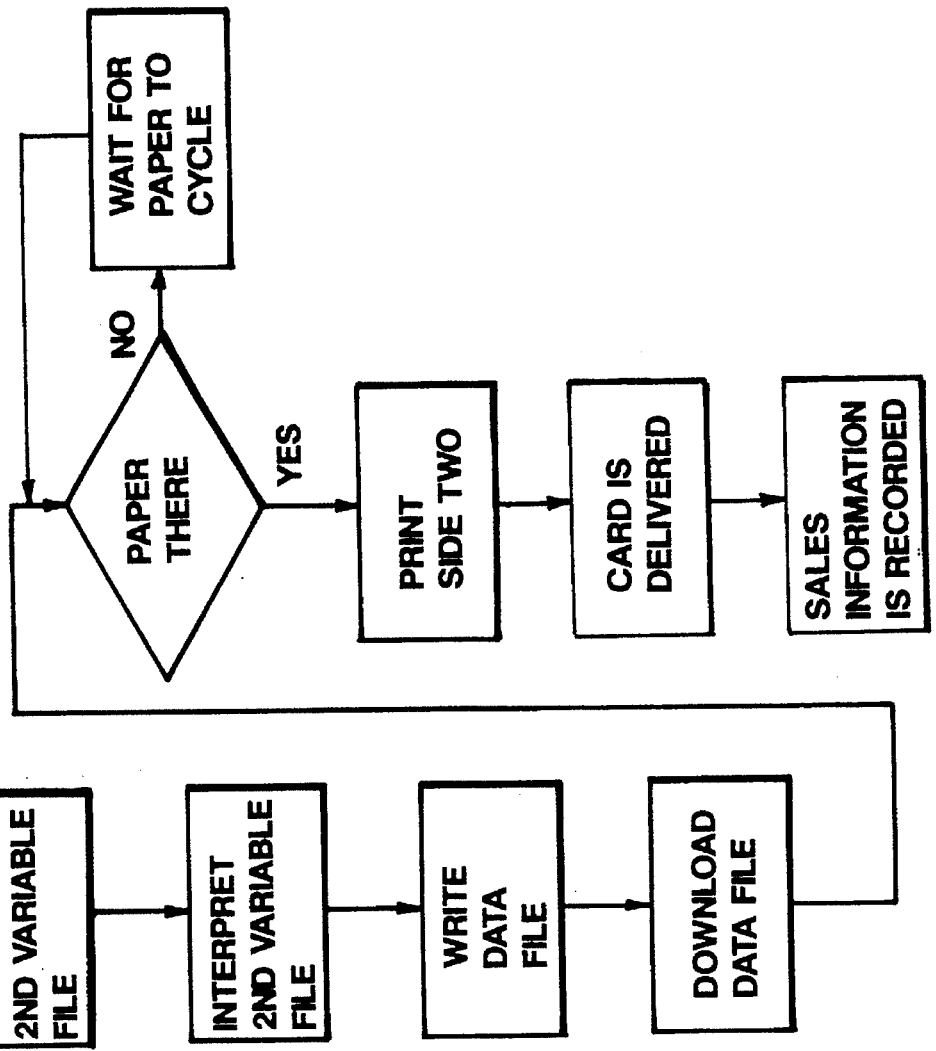

Once the first side of the personalized product is printed, the background computer 136 causes the base product, such as greeting card stock, to be reversed such that the second side may be printed. Turning net to FIG. 12, the background computer 136 then receives the second variable file, interprets that file and writes a second data file. Where a nonpersonalized product is selected or a customer elects not to personalize a personalizable product, the appropriate related data file is accessed by the background computer 136. The second data file, appropriate to the product selected, is then downloaded, the background computer 136 determines whether the base product in the proper position, and the second side of the personalized product, such as a personalized greeting card, is printed and the card and envelope are delivered.

In accordance with the preferred embodiment of the invention, sales information including: the dollar value of the sales made to consumers, the time of the sale, the product sold, and, at the buyer's option, the buyer's answers to the various marketing and consumer survey questions such as the age of the buyer, the age of the intended recipient, the number of similar products recently purchased by the buyer, and the income bracket of the buyer is thereafter recorded by the background computer. This information is recorded so that a periodic report of the information may be compiled and provided to the machine's owner or operator. In addition, cumulative data may also be maintained such that comparisons between, for example, daily, monthly and yearly sales may be made. Once such cumulative data is maintained by the background computer 136, that information may also be compiled, manipulated and reported periodically.

A report compiled concerning sales and other marketing and consumer information is conveniently called a periodic sales, marketing and consumer information report. While in the description of the machine 10, such sales, marketing and consumer information are maintained and compiled by the background computer 136, such information may be maintained and reports compiled by the foreground computer 110 just as well. That data may then be transferred to the background computer 136.

Figure 13:
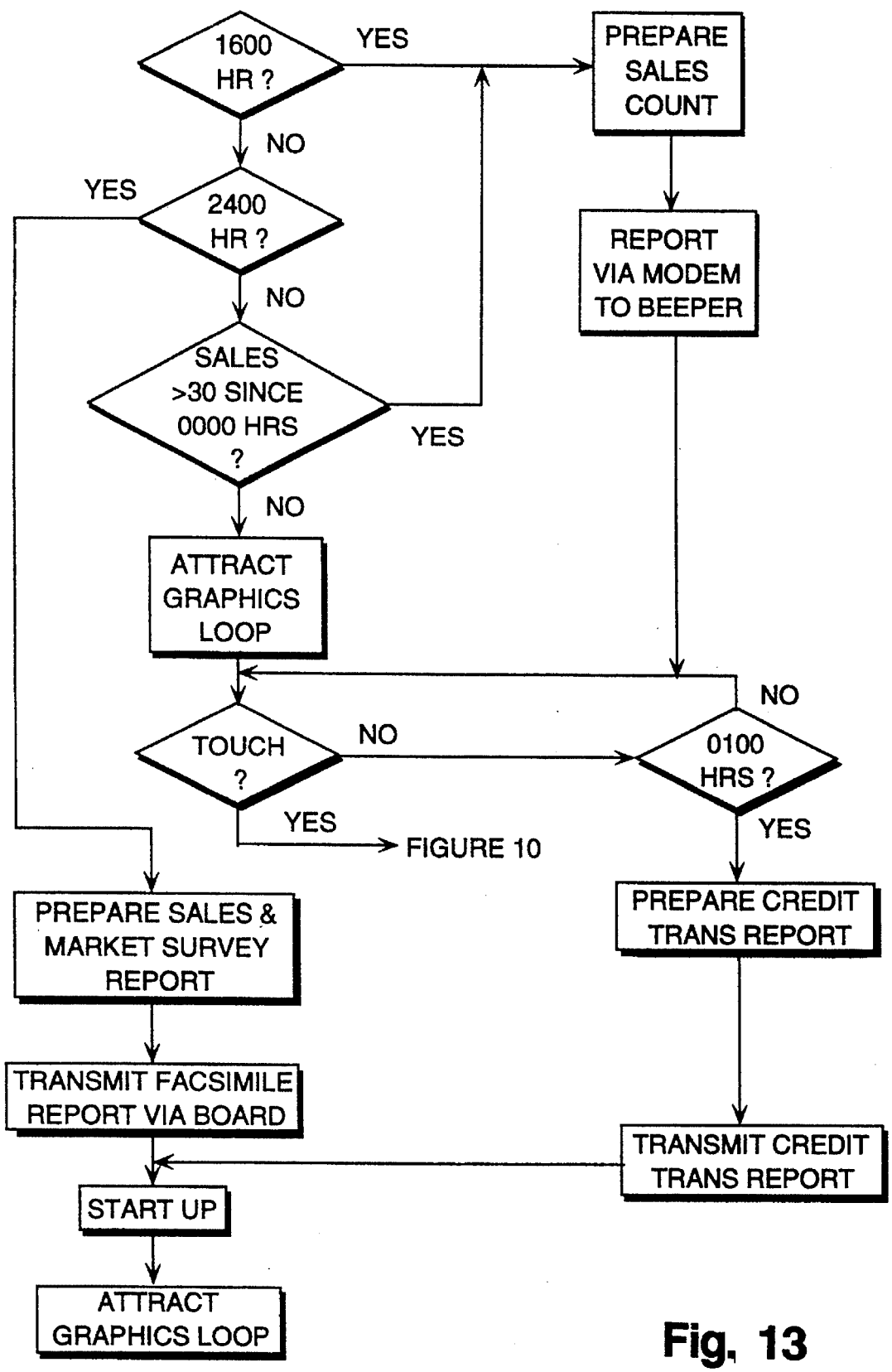

As depicted in FIG. 13, a periodic sales, marketing, and consumer information report is then compiled by the background computer and stored upon an appropriate storage media such as a hard disk at regular intervals, for example daily, at an appropriate time, for example at sometime between 12:00 midnight and 4:00 a.m. Generally, this report compilation may be made at any time. However, from midnight until the early morning hours is an especially suitable time as customer usage of the machine 10 is anticipated to be minimal at such times.

To enable a transfer of data at the appropriate time, the internal clock time keeping mechanisms of the foreground and background computers must keep accurate time. Should the location of the machine and the customer traffic patterns dictate, a more suitable time may be determined.

The machine 10 may be removed from the operational mode during compilation of this report although this is not required. This is best accomplished only upon the completion of the introductory presentation mode during which a consumer has failed to touch the screen at the appropriate place to begin a purchasing sequence. Where the machine 10 is removed from the operational mode during compilation of this report, the screen is preferably placed in a mode to indicate that the machine is temporarily out of service.

Upon compilation of the report by the background computer, the commercially available facsimile board control software is activated and the periodic sales, marketing, and consumer information report is manipulated by that software to enable facsimile transmission of the report to the remote location 154 as will be understood by those skilled in the art. Typical remote locations would include an owner's and/or operator's central maintenance facility or a business planning location. The remote location 154 would receive the report via a remote receiver such as a commercially available facsimile machine or a commercially available computer which is also equipped with a facsimile board and modem, as described above.

Where the machine 10 is taken out of active service during the compilation and transmission of the periodic sales, marketing, and consumer information report, the machine 10 must be reactivated. Upon completion of the report transmission, the machine 10 including the background computer and the foreground computer are reset such that the machine 10 is restarted in the introductory presentation mode.

Receipt of such compiled periodic sales, marketing and consumer information reports daily allows the owner and/or operator of the machine 10 to accurately judge the consumer's response to the machine 10 and to determine which products should be maintained or enhanced and which products may be deleted from the product line. A sample periodic sales, marketing and consumer information report, compiled at a time such as 3:00 a.m. may be constructed in the following manner:

| Sales Report December 31, 199X | | | | | | | |
|---|---|---|---|---|---|---|---|
| Period | Days | Credit | Cash | Refund | Total | Avg. | Avg $ |
| Last 24 hrs | 1 | 8 | 6 | 1 | 14 | 14.0 | 4.00 |
| Prev Day | 1 | 10 | 3 | 9 | 13 | 13.0 | 4.00 |
| Month | 31 | 185 | 220 | 125 | 405 | 13.1 | 4.00 |
| Year | 44 | 260 | 356 | 140 | 616 | 17.0 | 3.82 |
| Nov. | 13 | 75 | 136 | 15 | 211 | 16.2 | 3.50 |
| Dec. | 31 | 185 | 220 | 125 | 405 | 13.1 | 4.00 |

| Product Purchase Summary | |
|---|---|
| Personalized Product # | Quantity Sold |
| 33 | 90 |
| 9 | 70 |
| 11 | 48 |
| 18 | 44 |
| 4 | 44 |
| 15 | 41 |
| 19 | 22 |
| 23 | 22 |
| 1 | 22 |
| 6 | 21 |
| 26 | 19 |
| 32 | 19 |
| 78 | 16 |
| 22 | 15 |
| 45 | 14 |
| 12 | 12 |
| 108 | 12 |

| Consumer Research: Percent (%) | | | | |
|---|---|---|---|---|
| Purchases in Last 3 Mos. | For | For Age | Buyer Sex | Buyer Age |
| 1–4: 25 | Spouse: 12 | <10: 6 | Male: 54 | <10: 7 |
| 5–9: 39 | Parent: 8 | 10–18: 24 | Female: 46 | 10–18: 7 |
| 10+: 17 | Child: 7 | 19–25: 5 | | 19–25: 26 |
| None: 19 | Sibs: 14 | 26–39: 20 | | 26–39: 17 |
| | GrParnt: 3 | 40–49: 27 | | 40–49: 24 |
| | GrChild: 1 | 50–60: 7 | | 50–60: 5 |
| | Other: 55 | 60+: 11 | | 60+: 14 |

| Sales by Hour | | | | | | |
|---|---|---|---|---|---|---|
| | Previous Day | | Previous Month | | Previous Year | |
| Hour | Sales | Pct | Sales | Pct | Sales | Pct |
| 4 am | 0 | 0 | 0 | 0 | 0 | 0 |
| 5 am | 0 | 0 | 0 | 0 | 0 | 0 |
| 6 am | 0 | 0 | 2 | 0.5 | 6 | 1.0 |
| 7 am | 1 | 7.1 | 7 | 1.7 | 7 | 1.1 |
| 8 am | 0 | 0 | 7 | 1.7 | 11 | 1.8 |
| 9 am | 0 | 0 | 22 | 5.4 | 33 | 5.4 |
| 10 am | 2 | 14.3 | 30 | 7.4 | 45 | 7.3 |
| 11 am | 2 | 14.3 | 37 | 9.1 | 56 | 9.1 |
| Noon | 1 | 7.1 | 56 | 13.8 | 73 | 11.9 |
| 1 pm | 1 | 7.1 | 31 | 7.7 | 50 | 8.1 |
| 2 pm | 1 | 7.1 | 23 | 5.7 | 39 | 6.4 |
| 3 pm | 1 | 7.1 | 25 | 6.2 | 38 | 6.2 |
| 4 pm | 3 | 21.4 | 22 | 5.4 | 40 | 6.5 |
| 5 pm | 1 | 7.1 | 21 | 5.2 | 31 | 5.0 |
| 6 pm | 1 | 7.1 | 21 | 5.2 | 39 | 6.4 |
| 7 pm | 0 | 0 | 23 | 5.7 | 35 | 5.7 |
| 8 pm | 0 | 0 | 12 | 3.0 | 20 | 3.3 |
| 9 pm | 0 | 0 | 19 | 4.7 | 28 | 4.6 |
| 10 pm | 0 | 0 | 17 | 4.2 | 26 | 4.2 |
| 11 pm | 0 | 0 | 22 | 5.4 | 27 | 4.4 |
| 12 am | 0 | 0 | 6 | 1.5 | 8 | 1.3 |
| 1 am | 0 | 0 | 2 | 0.5 | 2 | 0.3 |
| 2 am | 0 | 0 | 0 | 0 | 0 | 0 |
| 3 am | 0 | 0 | 0 | 0 | 0 | 0 |

In addition to the periodic sales, marketing, and consumer information report, where the machine 10 accepts payment via credit card, a credit transaction report sufficient to obtain payment from the appropriate paying bank may also be compiled by the background computer 136 and transmitted via data transfer via the modem 150 or via the facsimile board 153 to a remote location 154. This report is also conveniently prepared and transmitted at sometime between 12:00 midnight and 4:00 a.m. As with the periodic sales, marketing, and consumer information report, the machine 10 may optionally be removed from service during the preparation and transmittal of the credit transaction report.

Also, in addition to compilation of various sales amounts and consumer and marketing surveys, various sensors well known to those skilled in the art, such as optical sensors, may be used to determine the level of base product available in the machine 10 for use in preparing the various personalized final products offered by the machine 10. These sensors may report data to the background computer 136 where that computer interprets the data and determines whether a base product or ancillary supply level is low. In an alternate embodiment, these sensors could report their data to the foreground computer for monitoring.

Further, assuming that a certain amount of base product is stored and ready for use within the machine 10, once sales in a particular day using that base product begin to approach that amount, a low level of base product available for use by the machine 10 may be logically deduced. For example, should the machine be capable of storing 50 pieces of base product material, once daily sales of final products using that base product have accumulated to, for example, 30 pieces, a prudent owner and/or operator of the machine 10 may wish to restock the machine with the appropriate base product. Should sales by the machine 10 during the day use a high percentage of the base product stored and available within the machine, a prudent owner and/or operator may wish to restock the machine so that, should sales occur during the night time, the machine 10 will not be shut down due to a lack of base product.

The background computer 136 may be programmed such that as total sales since the last periodic report increase to an amount which would indicate to the operator and/or owner that the amount of based product typically stored and available for use within the machine 10 would be insufficient to last until the next normally scheduled restocking of base product, a report of the sales total may be automatically compiled and reported to the owner and/or operator.

Such reports occur based upon either of two conditions. Where the owner and/or operator is concerned about supplies for any night time sales, a simple afternoon report of sales is generated at a suitable time such as 4:00 p.m. such that restocking of base product takes place prior to the completion of work hours. Further, should the machine 10 experience exceedingly rapid sales such that the available base products are depleted prior to the daily afternoon report, a special report is generated prior to the daily afternoon report. Such a special report may be triggered by, for example, use of 30 base products prior to the afternoon report.

Generation of an afternoon report or of a special report, however, does not accomplish restocking of the machine 10. The afternoon report or a special report may be generated and transmitted to the owner and/or operator at the remote location 154 by facsimile much like the periodic sales, marketing and consumer information report. However, maintenance personnel who service the machine often do not carry a facsimile machine. Most such maintenance personnel do, however, carry "pagers" or other receiver devices which receive information transmitted first over telephone lines and then via radio waves.

An appropriate pager for use in receiving transmissions concerning an afternoon report or a special report is capable of receiving and displaying digital information including at least an identifying code indicating the location of the machine 10 transmitting the information where multiple machines are monitored, an identifying code indicating the reason for the call, and the number of sales made by the machine 10 since the last periodic sales, marketing and consumer information report. The code displayed on such a pager could be presented by three sets of numbers "78-5-31". In such a report sequence, the set "78" indicates the machine transmitting the information, the "5" indicates the type of report, for example, a special report of sales since the last periodic sales, marketing and consumer information report, and the "31" indicates the number of sales. A report sequence of "78-6-28" could be used wherein the "6" indicates an afternoon report of sales from machine 78 and that 28 sales have been made since the last periodic sales, marketing and consumer information report.

As with the periodic sales, marketing and consumer information report, the machine 10 may optionally be removed from service when a special report or an afternoon report is generated and transmitted. The machine 10 is preferably only removed from service when a consumer's purchase is not interrupted by the manipulation of data and ultimate transfer of data. As may be done with the periodic report, this is accomplished by beginning the compilation and transmission operation only upon the completion of the introductory presentation mode during which a consumer has failed to touch the screen at the appropriate place to begin a purchasing sequence. As with the periodic sales, marketing and consumer information report, upon completion of the report transmission, the machine 10, including the background computer 136 and the foreground computer 110, are reset to the introductory presentation mode.

As depicted in flow chart 14, the foreground computer 110 and the background computer 136 also preferably monitor the occurence of a power failure. In addition, the computers 110, 136 monitor themselves and the machine 10 for potential errors such as software failures, paper jams in the printer system, connecting cabling failures, and low levels of base products, such as base white paper card stock, and ancillary supplies, such as printer inks. Appropriate sensors and methods of detection are utilized as will be known to those skilled in the art.

Preferably, to aid in such monitoring, the printer 50 used in the invention contains output data points which may be accessed for monitoring of printer ancillary supplies such as inks. The foreground computer 110 also optimally maintains a self diagnosis ability wherein certain errors are detected and recorded by the foreground computer 110. Examples of such errors include:

1. Power Loss Detected
2. No Touch Screen Driver
3. Bad Touch Screen Driver Version
4. Bad Calibration Points
5. Bad Graphics Loading
6. Failure To Access Monitor
7. Failure To Access Background Computer
8. Improper Reading Of Product Definition File
9. Improper Reading Of Configuration File
10. Failure Of Background Computer To Respond The background computer 136 also preferably maintains a self diagnosis ability wherein certain errors and ancillary supply levels are detected and recorded. Further, the various level indicators of various base products as well as ancillary supply levels may be monitored by the background computer 136. Such self diagnosis, base product, and ancillary supplies monitored may include:

1. Escape Key Pressed
2. Base Product Transfer Means Not Responding
3. Invalid Base Product Transfer Means Response
4. Base Product Transfer Means Command Out Of Sequence
5. Printer Paper Jam
6. Printer Cleaner Solution Low
7. Printer Ink Color A Low
8. Printer Ink Color B Low
9. Printer Ink Color C Low
10. Printer Ink Color D Low
11. Printer Not Ready After Resets
12. Printer Not Ready After 5 Resets
13. Supply X Level Low
14. Base Product A Level Low
15. Printer Ink A, B, C or D Empty
16. Base Product Supply=0

Errors detected by either the foreground computer 110 or background computer 136 may be self correctable. In this case, the error is corrected, and the machine 10, if necessary, is restarted. Where a low level is detected by the background computer 136, a sufficient amount of the base product or ancillary supply such as ink should still be available to the machine. In such a case, the machine 10 may continue to operate. Should an error be detected by either the background computer 136 or the foreground computer 110 which prohibits the machine 10 from properly operating, the machine 10 is placed in an inactive status and the screen indicates that the machine is out of order or darkens. Just such a case would occur should paper jam in the printer prohibiting its proper operation.

Upon detection of any error or low level, the detecting computer generates an appropriate code, and optionally compiles a report, which identifies the error or low level detected, the computer detecting the error, and the machine 10 in which that computer is located. Information indicating the error detected or low level indicated is also appropriately stored on an appropriate storage media, such as a hard disk, by either the foreground computer 110 or background computer 136. Where an error is detected by the foreground computer 110, that code and optional report is then transmitted to the background computer 136.

Figure 14:
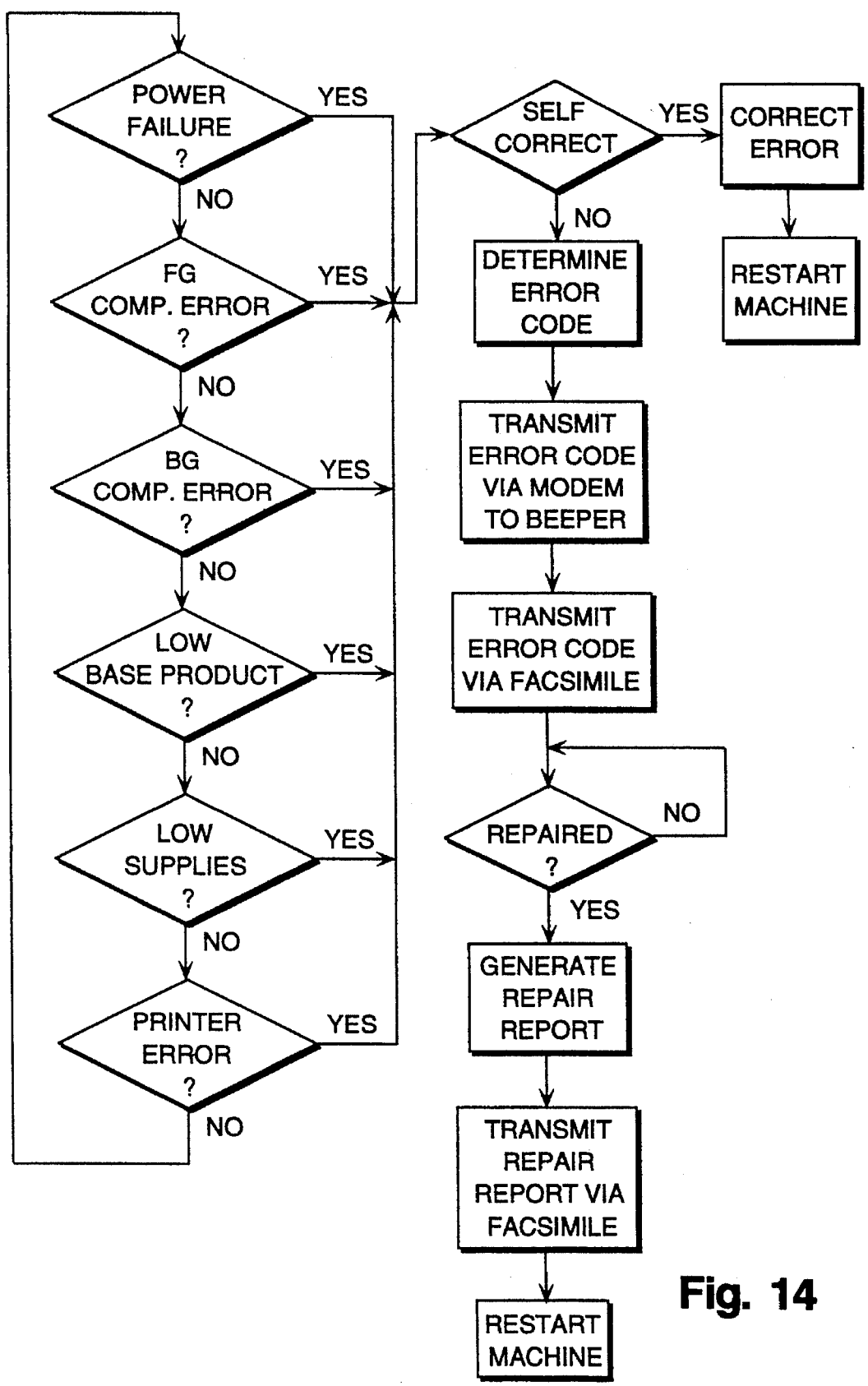
Figure 15:
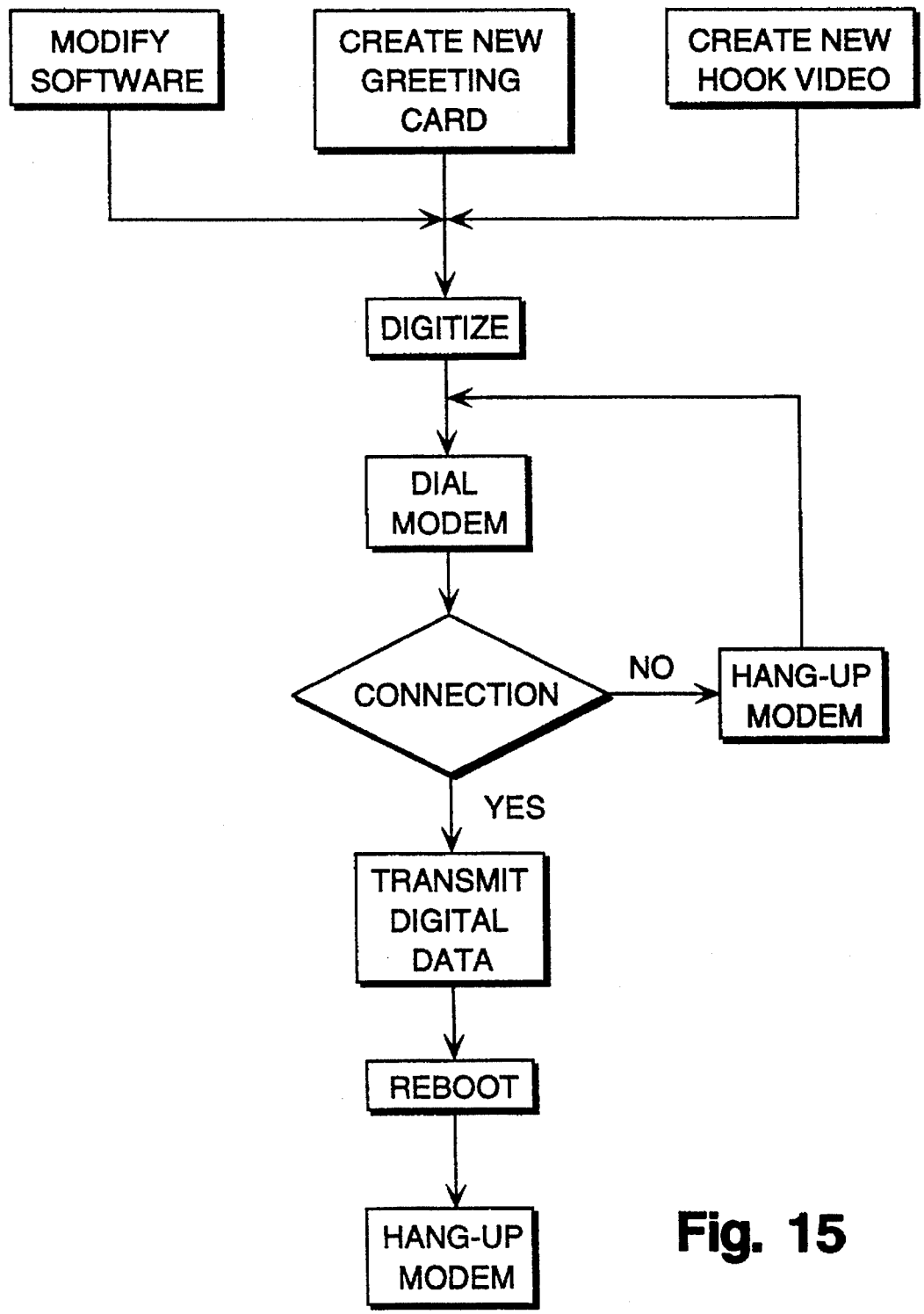

As shown in FIG. 14, once the error code or low level code is generated, and a report concerning the error or low level is optionally compiled, that information is appropriately transmitted to the remote location 154 so that the owner and/or operator may make any needed repairs or resupply necessary base products or ancillary supplies such as inks. As with other code or report transmissions, where the machine is still operational, the error or low level code transmission is optionally delayed until the completion of the introductory presentation mode during which a consumer has failed to touch the screen at the appropriate place to begin a purchasing sequence.

Also, where the machine 10 is operational, upon completion of the report transmission, the machine 10, including the background computer 136 and the foreground computer 110, are reset such that the machine 10 is restarted in the introductory presentation mode. Where the error detected renders the machine 10 inoperable, the code or report is immediately transmitted to the remote receiver.

As with the afternoon report or special report, the error or low level report is best transmitted rapidly to maintenance personnel most likely to service the machine. Again such personnel, who are often traveling in their vehicles, are most conveniently supplied with pagers. Once the identifying code or compiled report is either transferred to the background computer 136 by the foreground computer 110, or is actually generated by the background computer 136, that information may be transmitted via the modem 150 to a remote receiver. Where only a code is to be transmitted, the appropriate code may be transmitted through the modem 150 to the pager. Where a more detailed report is to be transmitted, the report is appropriately generated and then the commercially available support software associated with the facsimile board will manipulate that report and appropriately transmit that report via the modem 150 to a remote receiver such as a facsimile machine or a computer equipped with a facsimile board.

As with the afternoon and special reports, the preferred pager is capable of receiving and displaying digital information including at least an identifying code indicating the location of the machine 10 transmitting the information where multiple machines are being monitored, an identifying code indicating the reason for the call, and an identifying code indicating the error or low level detected by the foreground computer 110 or the background computer 136. The code displayed on such a pager could be presented by four sets of numbers "78-9-1-2". In such a report sequence, the first set "78" indicates the machine transmitting the information, the "9" indicates transmission of an error or low level report, "1" indicates that the error was detected by the foreground computer 110, and the "2" indicates that the error detected was a failure of the touch screen which had caused a shutdown of the machine 10.

A report sequence of 78-9-0-12 could also be transmitted wherein the 78 would indicate the machine transmitting the information where multiple machines are monitored, the 9 would indicate that this is an error or low level report, 0 would indicate that the error was detected by the background computer 136, and the 9 would indicate that a low level of printer ink C was detected. Upon receiving such a message, the receiver would also understand that the machine 10 was still operational but that maintenance would be required shortly.

An optional feature of the machine 10 includes generation of a facsimile report following the repair of a shut down error, non-shut down error or resupplying of base product or ancillary supplies. Such a report is transmitted to the remote owner and/or operator to indicate that maintenance personnel visited the machine following receipt of an error message and that the error or low level was corrected.

As depicted in flow chart 15, a final benefit of a machine 10 utilizing a modem and modifiable, i.e. writable, storage media such as writable compact disk, hard disks, hard cards and the like is that the machine 10, and ultimately the foreground computer 110 and the background computer 136, may be accessed from a remote location 154 by the owner and/or operator via the modem 150. Once the computers are accessible via the modem 150, computer programs, stored graphical information and other information stored in modifiable storage media may be modified from the remote location 154.

For example, in November, a machine 10 of the invention would conveniently be capable of providing personalized Birthday cards, Christmas cards, Anniversary cards and Thanksgiving cards. Following Christmas, the machine would more conveniently offer personalizable Birthday cards, Valentine's Day cards, Easter Cards and Anniversary cards. However, the owner and/or operator may not be able to personally visit a remotely located machine 10 without excessive expense. In such a case, the owner and/or operator may create the necessary new software, graphical representation of a product such as a greeting card, or new hook video to entice consumers. That information may then be digitized and the machine 10 is then accessed via the modem 150 which is connected to the background computer 136. Upon establishment of the appropriate connection with the background computer 136, the digital data may be transferred to the appropriate writable storage media, such as writable compact disk or hard disk, and the machine 10 may then be rebooted with the new stored information in place. With the more appropriate seasonal cards now in place, increased sales may be obtained from that machine 10.

It will be understood that modifications and variations may be effected without departing from the spirit and scope of the novel concepts of this invention.

What is claimed is:

1. A machine for delivering a social occasion product which may be automatically personalized by the customer at the time of purchase, said machine comprising: storage means for storing base product, delivery receptacle means, product handling means for effecting a series of operations and including electrically controllable transfer means for effecting transfer of base product from said storage means, electrically controllable printing means for printing graphics and text on said base product transferred by said transfer means and for effecting printing of both high quality graphics and text on said transferred base product for production of a personalized social occasion product, and electrically controllable delivery means for effecting delivery of said personalized social occasion product from said printing means to said delivery receptacle means, an enclosure containing said storage, receptacle and printing means therewithin, selection means operable by a customer on the outside of said enclosure to effect entry of control data to select graphics and text to be provided on the personalized greeting card to be delivered to the customer, computer means within said enclosure and coupled to said payment and selection means and to said electrically controllable transfer, printing and delivery means of said product handling means, said computer means controlling said transfer, printing, and delivery means of said product handling means following payment by a customer to perform a series of operations in accordance with said control data, said series of operations being performed within said enclosure without operator intervention and including transfer of base product from said storage means, printing of a sheet of base product transferred from said storage means and delivery of the desired final form of personalized greeting card from said printing means to said delivery receptacle means, said computer means monitering status and malfunction conditions of said machine during at least a portion of said operations, and generating a status report therefrom; and communication means coupling said computer means with a remote location, said computer means transmitting said status report to said remote location via said communication means.

2. A machine as defined in claim 1, further comprising payment means, operable by a customer on the outside of said enclosure to effect payment for said social occasion product.

3. A machine as defined in claim 1, wherein said social occasion product is a greeting card.

4. A machine as defined in claim 1, wherein said communication means includes data transceiver means coupled with said computer means, first data receiver means at said remote location, and a link connecting said first data transceiver means and said first data receiver means.

5. The machine as defined in claim 4, wherein said first data transceiver means is a modem.

6. The machine as defined in claim 4, wherein said first data receiver means is a pager.

7. The machine as defined in claim 4, wherein said first data receiver means is a modem.

8. A machine as defined in claim 4, wherein said first data transceiver means also receives data transmitted from said remote location.

9. A machine as defined in claim 4, wherein said first data transceiver means is a facsimile board.

10. A machine as defined in claim 1, wherein said base product is greeting card stock.

11. A machine as defined in claim 1, wherein said computer means maintains periodic sales, marketing and consumer information data and further compiles reports reflecting said periodic sales, marketing and consumer information data and wherein said computer means transmits said reports via said communication means.

12. A machine as defined in claim 1, said selection means including display means for displaying a plurality of social occasion product designs for selection by the customer.

13. A machine as defined in claim 12, said computer means being operable for controlling operation of said display means as well as said product handling means.

14. A machine as defined in claim 13, including memory means associated with said computer means for storage of data for selective display of said plurality of social occasion product designs by said display means and for printing of any selected one of said plurality of social occasion product designs by said printing means.

15. A machine as defined in claim 14, said computer means being arranged for downloading data from said memory means for printing of a social occasion product design while concurrently controlling said transfer means to transfer said base product to said printing means.

16. A machine as defined in claim 14, said computer means being arranged for operating said display means for entry by a customer of data for personalization of a social occasion product as well as for selection of a social occasion product design to be personalized.

17. A machine as defined in claim 1, said transfer means being arranged for transferring one sheet of said base product at a time from said storage means to said printing means.

18. A machine as defined in claim 1, said printer being arranged for printing color graphics and text on said base product.

19. A machine for delivering a greeting card which may be automatically personalized by the customer at the time of purchase, said machine comprising: storage means for greeting card stock, delivery receptacle means, product handling means for effecting a series of operations and including electrically controllable transfer means for effecting transfer of said greeting card stock from said storage means, electrically controllable printing means for printing graphics and text on said greeting card stock transferred by said transfer means and for effecting printing of both high quality graphics and text on said transferred greeting card stock for production of a personalized greeting card, and electrically controllable delivery means for effecting delivery of said personalized greeting card from said printing means to said delivery receptacle means, an enclosure containing said storage, receptacle and printing means therewithin, selection means operable by a customer on the outside of said enclosure to effect entry of control data to select graphics and text to be provided on the personalized greeting card to be delivered to the customer, computer means within said enclosure and coupled to said payment and selection means and to said electrically controllable transfer, printing and delivery means of said product handling means, said computer means maintaining periodic sales, marketing and consumer information data and further compiling reports reflecting said periodic sales, marketing and consumer information data, said computer means controlling said transfer, printing, and delivery means of said product handling means following payment by a customer to perform a series of operations in accordance with said control data, said series of operations being performed within said enclosure without operator intervention and including transfer of base product from said storage means, printing of a sheet of said greeting card stock transferred from said storage means and delivery of the desired final form of personalized greeting card from said printing means to said delivery receptacle means, said computer means monitoring status and malfunction conditions of said machine and generating a status report therefrom; and communication means coupling said computer means with a remote location, said computer means transmitting said status report and said periodic sales reports to said remote location.

20. A machine as defined in claim 19, further comprising payment means operable by a customer on the outside of said enclosure to effect payment for said greeting card.

21. A machine as defined in claim 19, further comprising payment means operable by a customer on the outside of said enclosure to effect payment for said social occasion product.

22. A machine as defined in claim 19, wherein said communication means includes data transceiver means coupled with said computer means, first data receiver means at said remote location, and a link connecting said first data transceiver means and said first data receiver means.

23. The machine as defined in claim 22, wherein said first data transceiver means is a modem.

24. The machine as defined in claim 22, wherein said first data receiver means is a pager.

25. The machine as defined in claim 22, wherein said first data receiver means is a modem.

26. A machine as defined in claim 22, wherein said first data transceiver means also receives data transmitted from said remote location.

27. A machine as defined in claim 22, wherein said first data transceiver means is a facsimile board.

28. A machine for delivering a social occasion product, said machine comprising: storage means for storing base product, delivery receptacle means, product handling means for effecting a series of operations and including electrically controllable transfer means for effecting transfer of base product from said storage means, electrically controllable printing means for printing graphics and text on said base product transferred by said transfer means and for effecting printing of both high quality graphics and text on said transferred base product, and electrically controllable delivery means for effecting delivery of said social occasion product from said printing means to said delivery receptacle means, an enclosure containing said storage, receptacle and printing means therewithin, selection means operable by a customer on the outside of said enclosure to effect entry of control data to select graphics and text to be provided on the social occasion product to be delivered to the customer, sensing means for detecting status and malfunction conditions of the machine and providing a plurality of output signals, computer means within said enclosure and coupled to said payment and selection means and to said electrically controllable transfer, printing and delivery means of said product handling means, said computer means controlling said transfer, printing, and delivery means of said product handling means following payment by a customer to perform a series of operations in accordance with said control data, said series of operations being performed within said enclosure without operator intervention and including transfer of base product from said storage means, printing of a sheet of base product transferred from said storage means and delivery of the desired final form of social occasion product from said printing means to said delivery receptacle means, and receiving said plurality of sensing signals and for generating a status report; and communication means coupling said computer means with a remote location, said communication transmitting said status report to said remote location.

29. A machine as defined in claim 28, further comprising payment means operable by a customer on the outside of said enclosure to effect payment for said social occasion product.

30. A machine as defined in claim 28, wherein said social occasion product is a greeting card.

31. A machine as defined in claim 28, wherein said communication means includes data transceiver means coupled with said computer means, first data receiver means at said remote location, and a link connecting said first data transceiver means and said first data receiver means.

32. The machine as defined in claim 31, wherein said first data transceiver means is a modem.

33. The machine as defined in claim 31, wherein said first data receiver means is a pager.

34. The machine as defined in claim 31, wherein said first data receiver means is a modem.

35. A machine as defined in claim 31, wherein said first data transceiver means also receives data transmitted from said remote location.

36. A machine as defined in claim 31, wherein said first data transceiver means is a facsimile board.

37. A machine as defined in claim 28, wherein said base product is greeting card stock.

38. A machine as defined in claim 28, wherein said computer means maintains periodic sales, marketing and consumer information data and further compiles reports reflecting said periodic sales, marketing and consumer information data and wherein said computer means transmits said reports via said communication means.

\* \* \* \* \*